(12) United States Patent
Sasaki

(10) Patent No.: US 11,120,614 B2
(45) Date of Patent: Sep. 14, 2021

(54) IMAGE GENERATION APPARATUS AND IMAGE GENERATION METHOD

(71) Applicant: Sony Interactive Entertainment Inc., Tokyo (JP)

(72) Inventor: Nobuo Sasaki, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 72 days.

(21) Appl. No.: 16/642,423

(22) PCT Filed: Jun. 14, 2018

(86) PCT No.: PCT/JP2018/022808
§ 371 (c)(1),
(2) Date: Feb. 27, 2020

(87) PCT Pub. No.: WO2019/049457
PCT Pub. Date: Mar. 14, 2019

(65) Prior Publication Data
US 2020/0258290 A1 Aug. 13, 2020

(30) Foreign Application Priority Data
Sep. 7, 2017 (WO) .................. PCT/JP2017/032373

(51) Int. Cl.
G06T 15/20 (2011.01)
G06T 15/04 (2011.01)
(52) U.S. Cl.
CPC .............. G06T 15/20 (2013.01); G06T 15/04 (2013.01); G06T 2215/06 (2013.01)
(58) Field of Classification Search
None
See application file for complete search history.

(56) References Cited

U.S. PATENT DOCUMENTS 6,249,289 B1 * 6/2001 Arnaud ................. G06T 15/005
345/419
6,677,939 B2 * 1/2004 Uchiyama ............ H04N 13/383
345/419
(Continued)

FOREIGN PATENT DOCUMENTS

JP 11296686 A 10/1999
JP 4714919 B2 7/2011
WO 200223484 A1 3/2002

OTHER PUBLICATIONS

International Search Report for corresponding PCT Application PCT/JP2018/022808, 2 pages, dated Aug. 28, 2018.
(Continued)

Primary Examiner — Tapas Mazumder
(74) Attorney, Agent, or Firm — Matthew B. Dernier, Esq.

(57) ABSTRACT

In an image generation apparatus, a virtual space generation section generates a virtual space in which an object and a virtual camera are arranged in accordance with input information acquired by an input information acquisition section. An intermediate image generation section draws the virtual space by a past technique. A curved surface generation section of a display image generation section generates, for each polygon of an object, a curved surface corresponding to the polygon. A pixel displacement acquisition section acquires a correspondence in pixel position between an image drawn with a planar polygon and a curved surface image. A drawing section determines color values of the pixels of the display image in accordance with the correspondence by referring to an original image. An output section outputs data of the display image generated as described above to a display apparatus.

16 Claims, 21 Drawing Sheets

(56) References Cited

U.S. PATENT DOCUMENTS

| 7,084,883 | B2 | 8/2006 | Sasaki |
| 2002/0005856 | A1 | 1/2002 | Sasaki |
| 2007/0040830 | A1* | 2/2007 | Papageorgiou ......... G06T 15/08 |
| | | | 345/424 |

OTHER PUBLICATIONS

International Search Report for corresponding PCT Application PCT/JP2017/032373, 2 pages, dated Nov. 21, 2017.
International Preliminary Report on Patentability and Written Opinion for corresponding PCT Application PCT/JP2018/022808, 11 pages, dated Mar. 19, 2020.

* cited by examiner (a)　　　　　　　　　(b)

(a)   (b)

(a)   (b)

(a)　　　　　　　　　　　　(b)

(a)

(b)

(a)

(b)

IMAGE GENERATION APPARATUS AND IMAGE GENERATION METHOD

CROSS REFERENCE TO RELATED APPLICATIONS

This application is a National Stage application claiming priority to International Application No.: PCT/JP2018/022808, filed on Jun. 14, 2018, which claims priority to International Application No.: PCT/JP2017/032373, filed on Sep. 7, 2017, the entire disclosures of which are hereby incorporated by reference.

TECHNICAL FIELD

The present invention relates to an image generation apparatus and an image generation method for generating a display image representing an object model.

BACKGROUND ART

Three-dimensional computer graphics has become a familiar technology irrespective of fields. In recent years, there have been widely used technologies for realizing a virtual reality by causing a head-mounted display to display a virtual world image and changing a field of view in response to a user's head motion. In a mode for changing the field of view or causing what appears to progress in response to user operation irrespective of types of display apparatuses, in particular, it is always an important challenge to strike a balance between image quality and drawing process speed. This has made realistic representation possible through simple processing by introducing an ingenious approach to object surface processing techniques such as texture mapping, bump mapping, and reflection mapping.

SUMMARY

Technical Problems

In the case of processing that is complete on an object surface as described above, the originally designed shape of a model may not be amply represented or may appear unnatural when the model is enlarged or changed in angle. This can be particularly problematic if the technology allows one to stereoscopically view a virtual world by using the above head-mounted display. Possible countermeasures would be assignment of more detailed data to the object model itself and creation of a more detailed shape in the stage of a drawing process. However, this leads to increased processing cost, thus hindering speedup.

The present invention has been devised in light of the foregoing, and it is an object of the present invention to provide a technology that allows for generation of high-quality images without increasing processing costs.

Solution to Problems

An aspect of the present invention relates to an image generation apparatus. This image generation apparatus is an image generation apparatus for generating an image representing a space including a three-dimensional object. The image generation apparatus includes an intermediate image generation section, a pixel displacement acquisition section, a drawing section, and an output section. The intermediate image generation section generates an intermediate image by projection onto a polygon plane included in the object. The pixel displacement acquisition section acquires information regarding displacement of position coordinates of the intermediate image that arises as a result of displacement of position coordinates on the polygon in a three-dimensional space according to a given rule. The drawing section identifies a corresponding position of the intermediate image for each pixel of a display image on the basis of the information regarding displacement and draws the display image by determining a color value at the position in question as a color value of the pixel of the display image. The output section outputs data of the display image. The pixel displacement acquisition section generates, as the information regarding displacement, a vector map that represents a reference vector for each of the pixels including the post-displacement position coordinates on an image plane of the display image. The reference vector has a start point at post-displacement position coordinates and an end point at pre-displacement position coordinates in the displacement of the position coordinates of the intermediate image.

Another aspect of the present invention relates to an image generation method. This image generation method is an image generation method for generating an image representing a space including a three-dimensional object and includes a step of generating an intermediate image by projecting a polygon included in the object onto a plane, a step of acquiring information regarding displacement of position coordinates of the intermediate image that arises as a result of displacement of position coordinates on the polygon in a three-dimensional space according to a given rule, a step of identifying a corresponding position of the intermediate image for each pixel of a display image on the basis of the information regarding displacement and drawing the display image by determining a color value at the position in question as a color value of the pixel of the display image, and a step of outputting data of the display image. The step of acquiring the information regarding displacement generates, as the information regarding displacement, a vector map that represents a reference vector for each of the pixels including the post-displacement position coordinates on an image plane of the display image. The reference vector has a start point at post-displacement position coordinates and an end point at pre-displacement position coordinates in the displacement of the position coordinates of the intermediate image.

It should be noted that an arbitrary combination of the above components and conversions of the expressions of the present invention between a method, an apparatus, a system, a computer program, and so on are also effective as modes of the present invention.

Advantageous Effect of Invention

The present invention allows for generation of a high-quality image without increasing processing costs.

DESCRIPTION OF EMBODIMENTS

Embodiment 1

Figure 1:
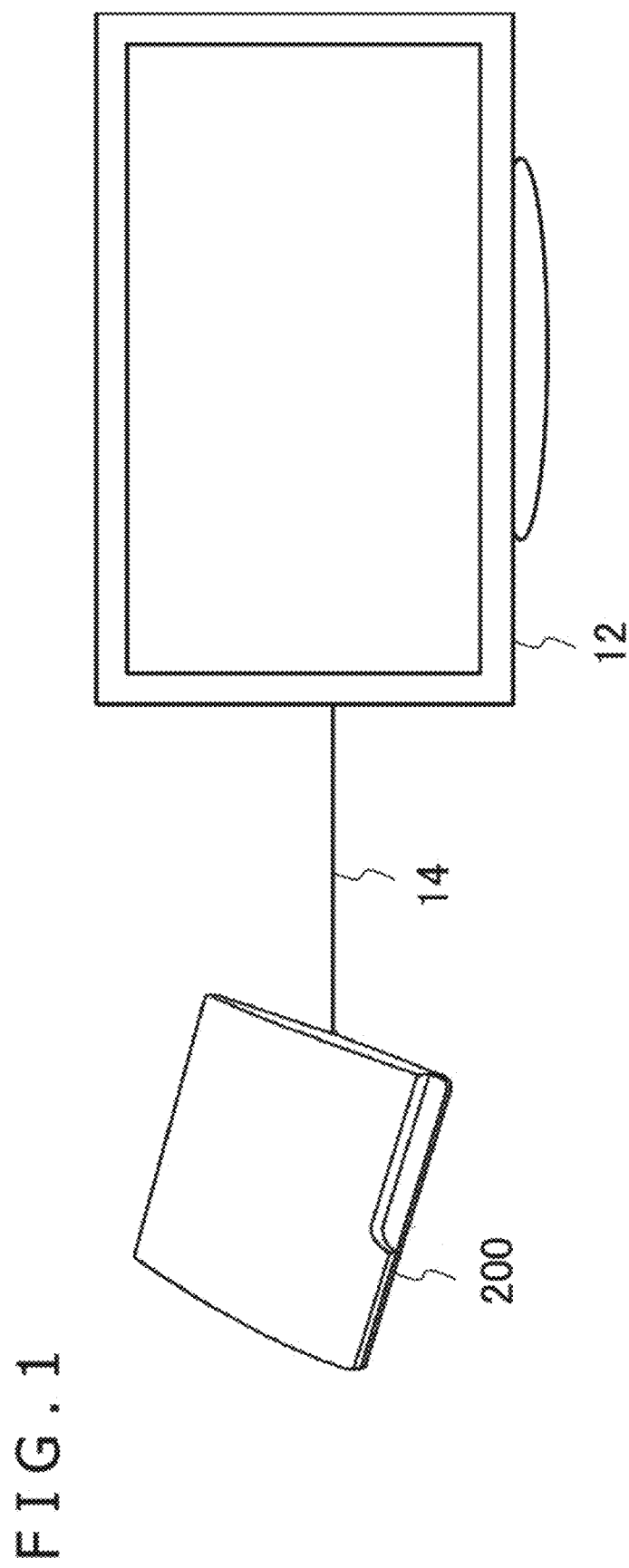
FIG. 1 is a diagram illustrating a configuration example of an image display system in Embodiment 1.

FIG. 1 is a diagram illustrating a configuration example of an image display system in the present embodiment. The image display system in this example includes an image generation apparatus 200 and a display apparatus 12. The image generation apparatus 200 generates a display image. The display apparatus 12 acquires data of the display image in question and displays the image. The display apparatus 12 is connected to the image generation apparatus 200 by means of an interface 14 such as wireless communication or universal serial bus (USB) for connecting peripheral equipment. The image generation apparatus 200 may be further connected to a server via a network. In this case, the server may provide, to the image generation apparatus 200, an online application such as a game in which a plurality of users can participate via the network.

The mode of the image display system is not limited to that illustrated. For example, the image generation apparatus 200 may be integral with the display apparatus 12 as a mobile terminal. Alternatively, the display apparatus 12 may be a head-mounted display that displays an image in front of user's eyes when worn on the user's head. In this case, stereoscopic view may be realized by displaying left and right eye images having parallax respectively in left and right regions obtained by dividing a screen into two.

The image generation apparatus 200 generates a display image by drawing a three-dimensional object on an image plane. To that extent, what is represented as an image is not particularly limited. For example, the image generation apparatus 200 may be a gaming apparatus that allows a game to progress in accordance with user operation and generates and outputs game images one after another. In that case, the image display system may further include an input apparatus for user operation. In a case where a head-mounted display is used as the display apparatus 12, the display apparatus 12 may acquire the head motion by using built-in motion sensors or other devices and reflect the head motion in the display image as input information. It is to be understood by those skilled in the art that various other purposes of generating an image by using the image generation apparatus 200 are possible in addition to the above.

Figure 2:
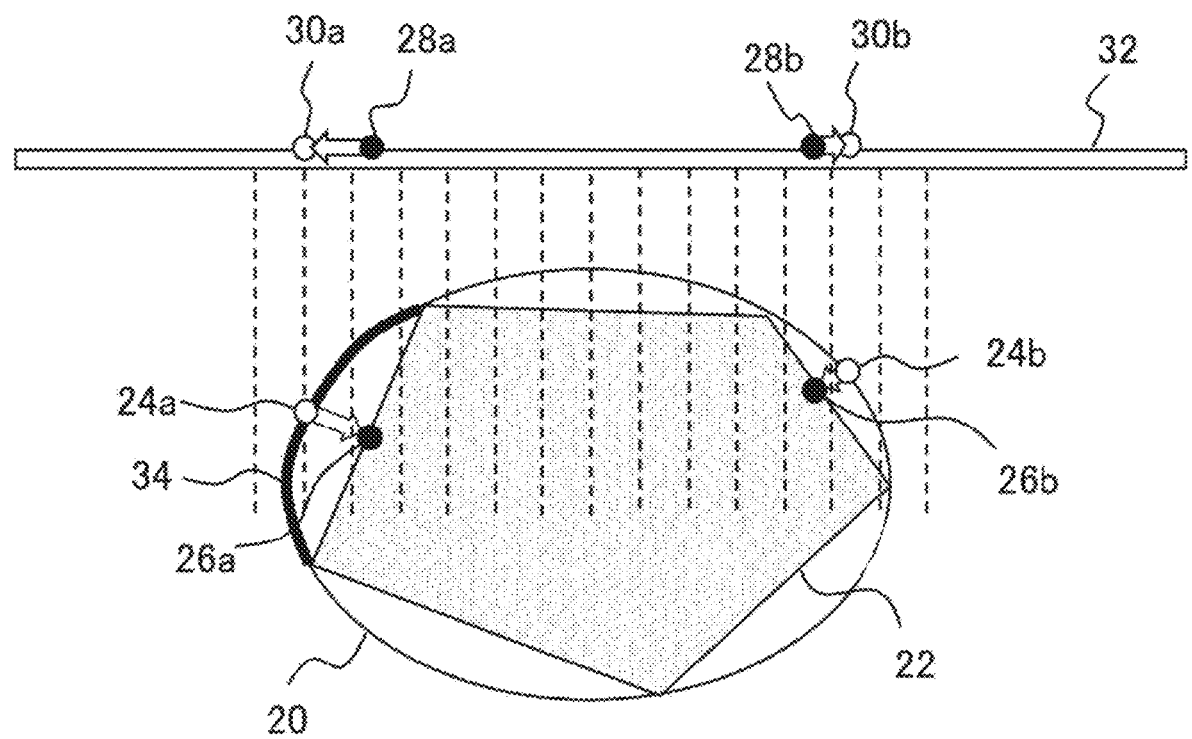
FIG. 2 is a diagram schematically illustrating a relationship between an object and an image plane in Embodiment 1.

A three-dimensional object is generally represented by connecting planes in a given shape such as polygons. The drawing of a display image is realized by projecting this plane onto an image plane first and then determining a color value for each pixel by means of texture mapping or other technique. FIG. 2 schematically illustrates a relationship between an object and an image plane. FIG. 2 illustrates a bird's eye view of an object 20 and an image plane 32. Also, parallel projection is used for ease of understanding, and dotted lines are extensions of boundaries between pixels on the image plane 32 into the three-dimensional space.

Even if a model of the object 20 is a curved surface, the model can be approximated by connecting polygons as described above. A shaded polygon 22 in FIG. 2 depicts a polygon model approximated in such a manner. The approximation in this manner causes points 24*a* and 24*b*, the points that should otherwise be located on the surface of the object 20, to be represented as points 26*a* and 26*b* on the polygon. The projection of these onto the image plane 32 causes a silhouette to appear at points 28a and 28b that are out of position in relation to points 30a and 30b, which are original points of the silhouette. In a case where a virtual camera that prescribes the position of the image plane 32 is away from the object 20, or in a case where, even if the virtual camera is close to the object 20, the surface of the object 20 is face-to-face with the image plane, it is unlikely that such deviation of points will be visually identified.

Conversely, in a case where the object 20 is enlarged by bringing the virtual camera close thereto, or in portions close to a contour of the object 20 as seen from the image plane 32 such as the points illustrated, a deviation attributable to approximation by polygons is likely to be visually identified. This leads to a possibility that the original design of the object 20 may not be fully represented or that viewers may have a sense of discomfort. For this reason, the image generation apparatus 200 of the present embodiment draws an image that artificially represents an original silhouette of the object 20 by displacing position coordinates of the image obtained by projecting a polygon on the image plane.

For example, a color is caused to appear near the positions of the object 20 where the points 24a and 24b are projected by displacing the points 28a and 28b, obtained by projecting the points 26a and 26b on the polygon to the points 30a and 30b on the image plane. For this reason, the image generation apparatus 200 generates a curved surface (for example, a curved surface 34) corresponding to each polygon. This curved surface need not strictly represent the original shape of the object 20. It should be noted, however, that a more similar shape can be achieved by taking into consideration normal vectors of the object 20 at polygon vertices.

Then, a correspondence between positions in the three-dimensional space is acquired by mapping the original polygon onto the generated curved surface. For example, the point 26a on the polygon is associated with the point 24a on the curved surface. To perform this process, UVW coordinates employed for texture mapping are used. Then, it is possible to find a displacement destination (for example, point 30a) on the image plane 32 by projecting a post-mapping position onto the image plane 32. This makes it possible to represent a silhouette close to the original shape of the object even with a small number of polygons.

It should be noted that this process may be performed only for a specific object in a virtual space. For example, the process may be performed only for an object having a high proportion of curved surfaces or an object that plays a major role. Also, the process in question may be initiated when a magnification factor of the object reaches or exceeds a given value.

Figure 3:
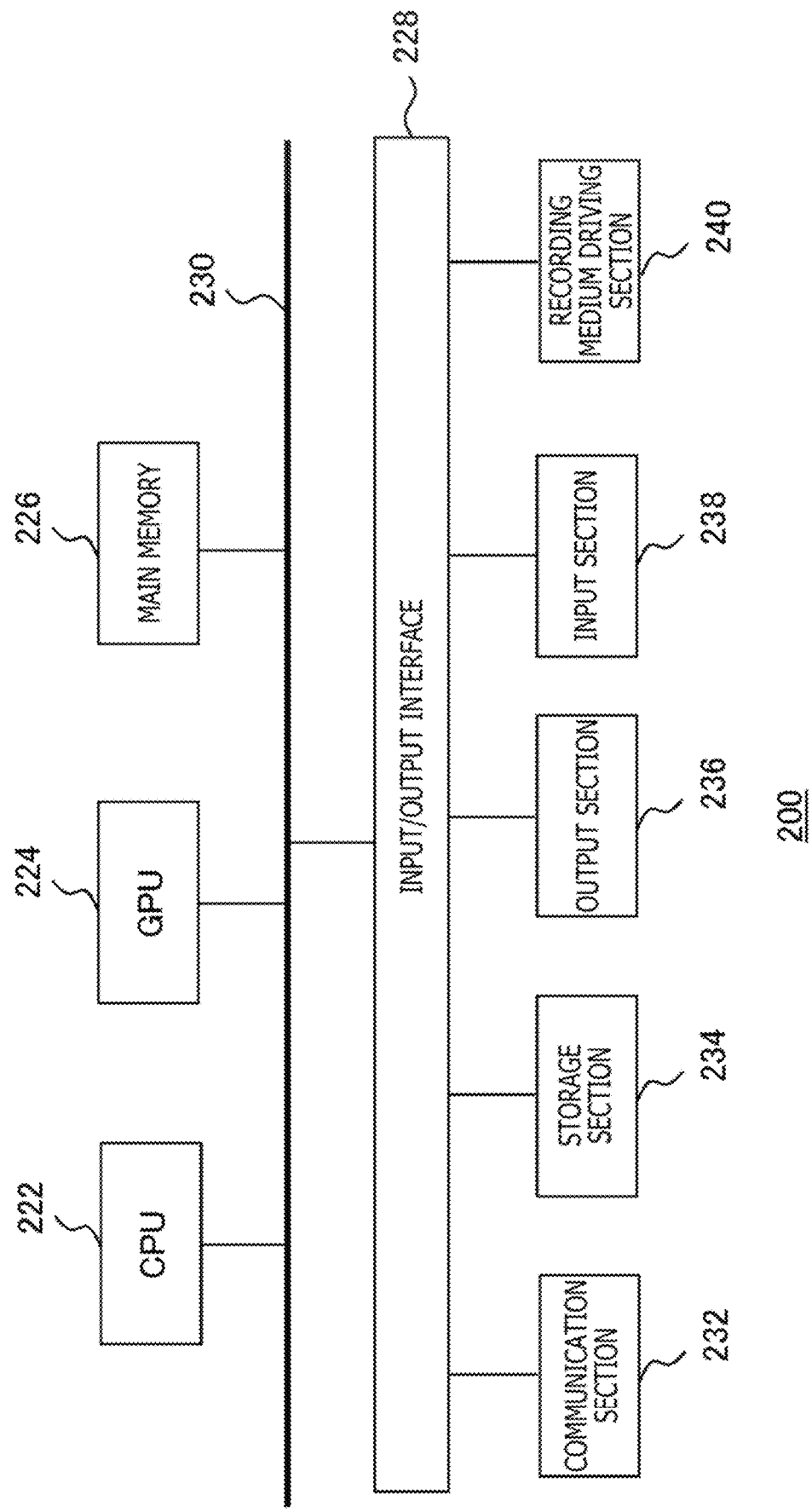
FIG. 3 is a diagram illustrating an internal circuit configuration of an image generation apparatus in Embodiment 1.

FIG. 3 illustrates an internal circuit configuration of the image generation apparatus 200. The image generation apparatus 200 includes a central processing unit (CPU) 222, a graphics processing unit (GPU) 224, and a main memory 226. These respective sections are connected to each other via a bus 230. An input/output interface 228 is further connected to the bus 230.

To the input/output interface 228, connected are a communication section 232 including peripheral equipment interfaces such as USB and Institute of Electrical and Electronic Engineers (IEEE) 1394, a wired or wireless local area network (LAN) network interface, a storage section 234 including a hard disk drive, a non-volatile memory, or other storage device, an output section 236 outputting data to the display apparatus 12, an input section 238 inputting data from an input apparatus or other device that is not illustrated, and a recording medium driving section 240 driving a removable recording medium such as a magnetic disk, an optical disc, a semiconductor memory, or other medium.

The CPU 222 controls the image generation apparatus 200 as a whole by executing an operating system stored in the storage section 234. The CPU 222 also executes various types of programs read out from a removable recording medium and loaded into the main memory 226 or downloaded via the communication section 232. The GPU 224 has functions of a geometry engine and a rendering processor, performing a drawing process in accordance with a drawing instruction issued from the CPU 222 and storing a display image in a frame buffer that is not illustrated. Then, the GPU 224 converts the display image, stored in the frame buffer, into a video signal and outputs the video signal to the output section 236. The main memory 226 includes a random access memory (RAM) and stores programs and data required to perform processing.

Figure 4:
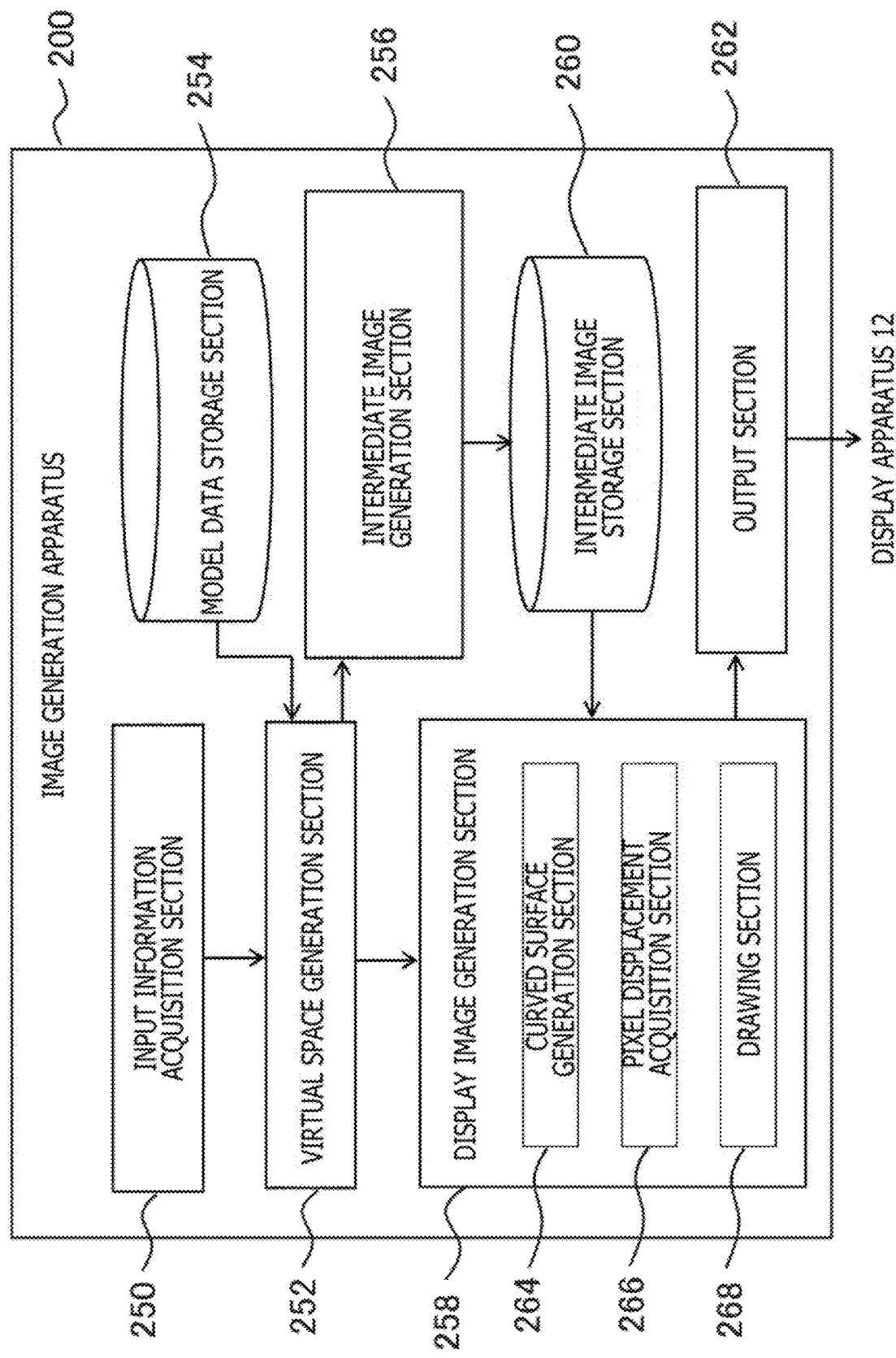
FIG. 4 is a diagram illustrating functional blocks of the image generation apparatus in Embodiment 1.

FIG. 4 illustrates functional blocks of the image generation apparatus 200 in the present embodiment. It should be noted that, of the functions of the image generation apparatus 200 illustrated in FIG. 4, at least some thereof may be implemented in the display apparatus 12. Alternatively, at least some of the functions of the image generation apparatus 200 may be implemented in the server connected to the image generation apparatus 200 via the network. Still alternatively, the image generation apparatus 200 may be part of a gaming console, a mobile terminal, a personal computer, or other information processing apparatus.

FIG. 4 depicts a block diagram focusing, of the functions of the image generation apparatus 200, mainly those functions for generating a display image. These functional blocks can be realized, in terms of hardware, by building blocks such as CPU, GPU, and various types of memories illustrated in FIG. 3 and, in terms of software, by programs that provide a data input function, a data retention function, an image processing function, a communication function, and other functions loaded into the memory from the recording medium or other medium. Therefore, it is to be understood by those skilled in the art that these functional blocks can be realized in various ways by hardware alone, software alone, or by a combination thereof and that these functional blocks are not limited to any one of them.

The image generation apparatus 200 includes an input information acquisition section 250, a virtual space generation section 252, a model data storage section 254, an intermediate image generation section 256, and an intermediate image storage section 260. The input information acquisition section 250 acquires input information such as user operation. The virtual space generation section 252 generates a virtual space including an object model in response to input information. The model data storage section 254 stores object model data. The intermediate image generation section 256 generates a virtual space image by using a common technique. The intermediate image storage section 260 stores data of the intermediate image in question. The image generation apparatus 200 further includes a display image generation section 258 and an output section 262. The display image generation section 258 generates a display image from the intermediate image on the basis of pixel displacement when polygons included in the object are curved surfaces. The output section 262 outputs data of the display image in question to the display apparatus 12.

The input information acquisition section 250 acquires input information such as user operation. For example, in a case where a game is realized that displays a virtual space, a signal regarding details of operation of the game is acquired from a game controller that is not illustrated. It should be noted, however, that input information for defining a virtual space is not limited to user operation and may be a request signal issued from other apparatus. The virtual space generation section 252 arranges an object and a virtual camera in a virtual space in accordance with input information. This process is similar to that in common three-dimensional computer graphics. In a case where a program for generating a virtual space, or the like is defined in the virtual space generation section 252, input information is not essential.

The model data storage section 254 stores object data. The data in question includes a polygon mesh that includes a plurality of primitives. The intermediate image generation section 256 generates an image by projecting a virtual world object onto a screen of the virtual camera. This process need only be similar to a common process, and a pixel value is determined by projecting a polygon of an object onto the virtual camera's screen and interpolating vertex information and referring to texture for each pixel. This image is intermediate data used to generate a display image as is described above and will be hereinafter referred to as an "intermediate image."

Generated intermediate image data is stored in the intermediate image storage section 260. The display image generation section 258 includes a curved surface generation section 264, a pixel displacement acquisition section 266, and a drawing section 268. The curved surface generation section 264 generates a curved surface patch corresponding to a polygon plane. The pixel displacement acquisition section 266 identifies a position on the curved surface patch corresponding to a pixel center of the intermediate image and acquires position coordinates when the position is projected onto the screen. Then, the pixel displacement acquisition section 266 acquires a positional relationship with the original pixel center.

Here, the pixel displacement acquisition section 266 discretely finds position coordinates on the curved surface corresponding to each polygon in the three-dimensional space and generates a map that stores information regarding displacement of each pixel at a position of the screen where each set of coordinates are projected. As long as this is realized, the curved surface generation section 264 need not strictly generate a curved surface as a continuous surface. That is, data generated by the curved surface generation section 264 need only prescribe a relationship between discrete position coordinates on polygons and corresponding position coordinates on a curved surface and is not limited to data that directly defines a curved surface shape.

Also, the curved surface generation section 264 may define parametric interpolation for a single component rather than generating a curved surface patch. Parametric interpolation for a single component derives, from each pixel on the polygon plane, a distance to a point on the curved surface patch that is located in a normal direction of the pixel in question acquired by interpolating a normal vector of the object at each vertex of the polygons. In this case, the pixel displacement acquisition section 266 acquires a distance value from the position on the polygons corresponding to the pixel of the intermediate image to the curved surface patch through parametric interpolation.

Further, minute displacement of the curved surface from an end point of the normal by which the distance is multiplied may be stored as a distance map as texture to be mapped onto the polygons, thus moving the end point position in the normal direction. Even if the object shape changes and the angle formed between the polygons changes, discontinuity of a tangent plane at a boundary is corrected by the above distance parametric interpolation, thus allowing a curved surface having natural minute displacement to be displayed.

The drawing section 268 draws a display image by displacing the position coordinates of the intermediate image on the basis of the positional relationship in question. This process is actually realized by identifying the position coordinates on the intermediate image for each pixel of the display image by tracing back the displacement of the position coordinates on the image surface as a result of curving of the polygons and acquiring color values by using the position coordinates as sampling points. A detailed description will be given later. The output section 262 converts, as appropriate, data of the display image drawn, into a video signal and outputs the video signal to the display apparatus 12.

Figure 5:
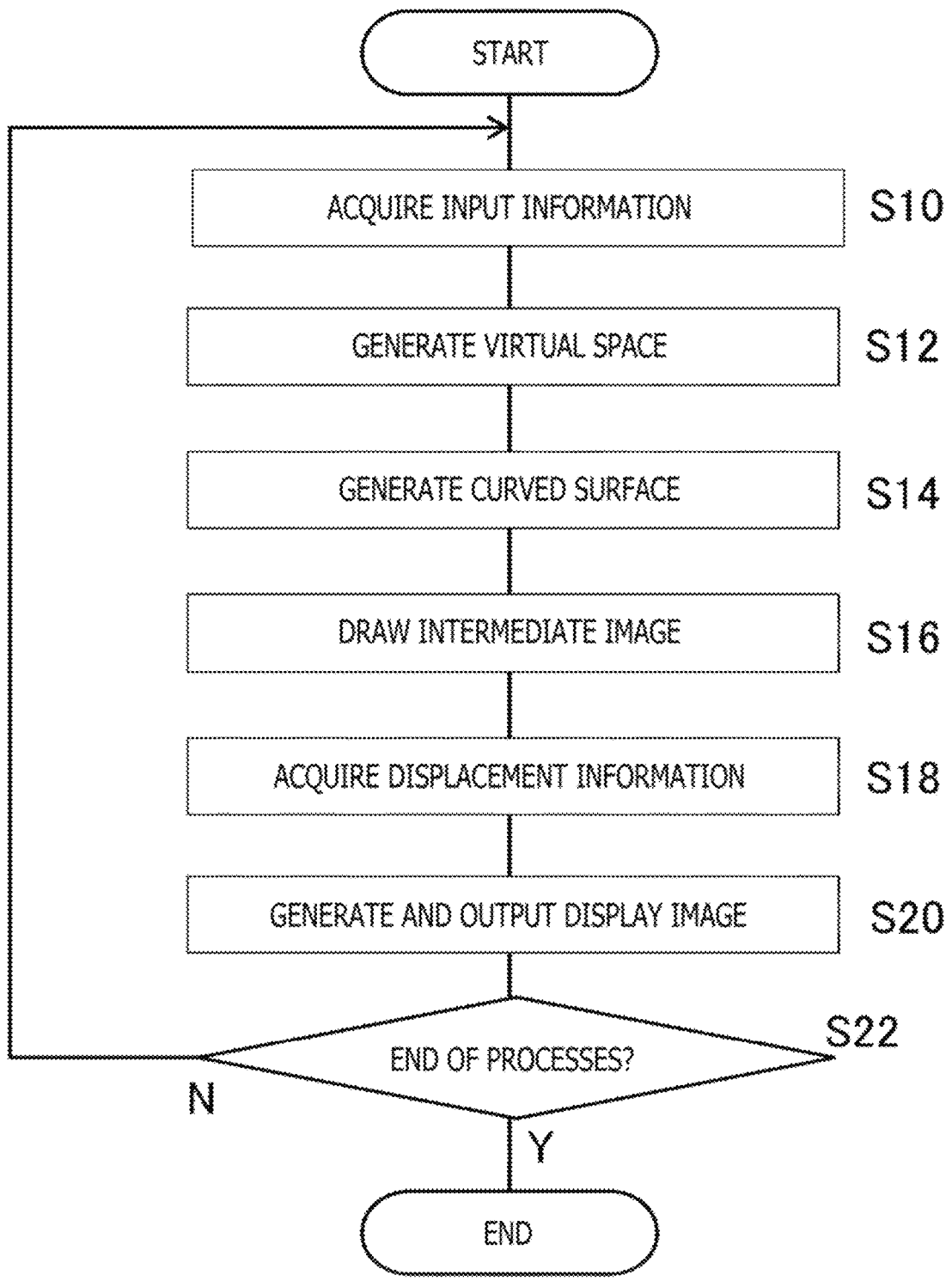
FIG. 5 is a flowchart illustrating a processing procedure for the image generation apparatus in Embodiment 1 to generate a display image.

A description will be given next of operation of the image processing apparatus that can be realized by the configuration described above. FIG. 5 is a flowchart illustrating a processing procedure for the image generation apparatus 200 to generate a display image. First, the virtual space generation section 252 acquires input information from the input information acquisition section 250 (S10) and arranges an object and a virtual camera in a world coordinate system in response thereto (S12). Next, the curved surface generation section 264 of the display image generation section 258 generates a curved surface corresponding to a polygon included in the object (S14).

At this time, the curved surface generation section 264 generates a curved surface close to the object's surface shape for each polygon by referring to the normal vectors of the object at the polygon's vertices as described above. Next, the intermediate image generation section 256 generates an intermediate image by projecting the object onto the screen of the virtual camera (S16). This process is common computer graphics drawing that projects a polygon before its transformation into a curved surface onto the screen and maps texture.

Next, the pixel displacement acquisition section 266 acquires information regarding displacement of the position coordinates on the image plane when the polygon is transformed into a curved surface (S18). This information is, as described above, information for identifying a position on the intermediate image by tracing back the displacement in question starting from a pixel of the display image. For this reason, a displacement destination on the curved surface of the corresponding position on the polygon is found for each pixel of the intermediate image first, and then position coordinates of the displacement destination are identified when the displacement destination is projected onto the screen. A reference destination of the intermediate image can be acquired from the pixel position of the display image by finding an inverse vector of the vector representing the displacement in question. A specific example will be described later.

The drawing section 268 draws a display image and outputs the image to the display apparatus 12 by referring to the information regarding displacement and determining color values of the pixels of the display image on the basis of color values of the intermediate image as the reference destination (S20). If there is no need to terminate the process because of a request from the user or the termination of content (N in S22), the processes from S10 to S20 are repeated for a next image frame, and all the processes are terminated as the need for termination arises (Y in S22). It should be noted that, in frames other than the first frame, the process performed in S12 is a process to change the object or the virtual camera in the virtual space in accordance with input information acquired in S10.

Figure 6:
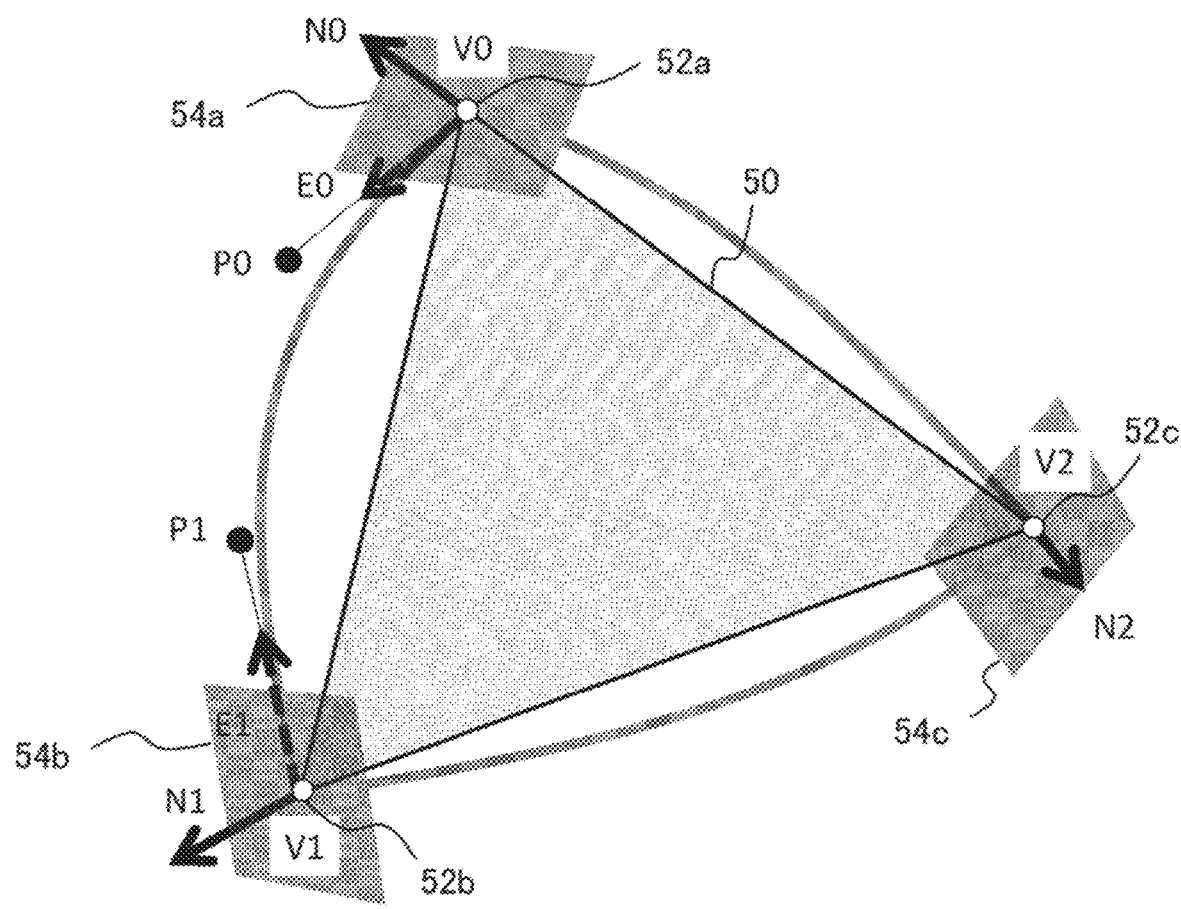
FIG. 6 is a diagram for describing a process performed by a curved surface generation section in Embodiment 1 to generate a curved surface for a polygon.
Figure 7:
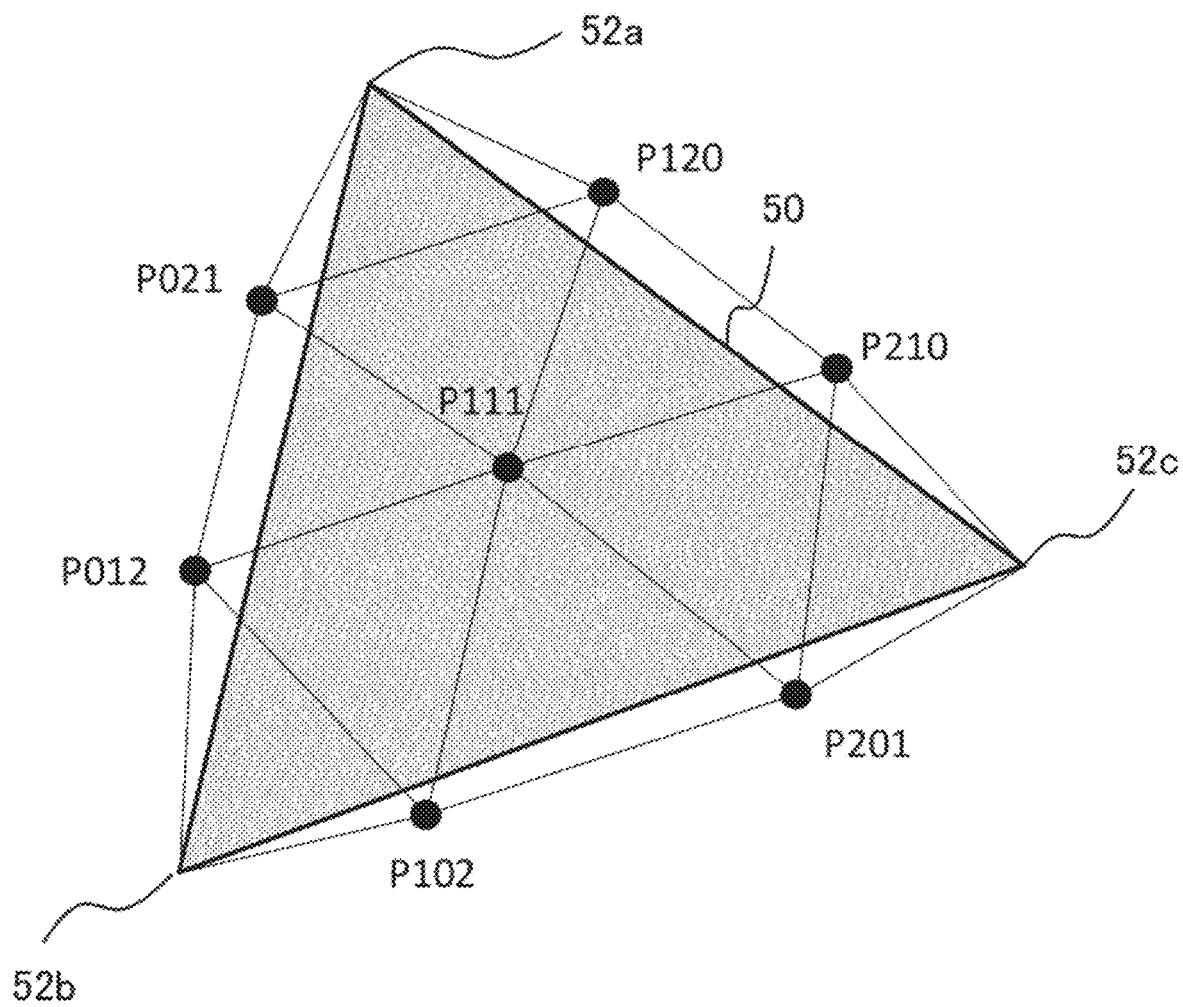
FIG. 7 is a diagram for describing the process performed by the curved surface generation section in Embodiment 1 to generate a curved surface for a polygon.

FIGS. 6 and 7 are diagrams for describing a process performed by the curved surface generation section 264 of the display image generation section 258 to generate a curved surface for a polygon. In this example, we assume that a triangle Bezier curved surface is generated. FIG. 6 illustrates a method for acquiring Bezier curve control points for sides of a polygon. A polygon 50 has vertices 52a, 52b, and 52c. As a result of arrangement of an object in a virtual space, the vertices 52a, 52b, and 52c have three-dimensional position coordinates V0, V1, and V2, respectively. Further, information regarding normal vectors N0, N1, and N2 of the object surface is associated with the respective vertices.

Normal vector information is also associated with vertices in Phong shading, a common shading technique, for use. A data structure thereof can also be used in the present embodiment. Next, vectors (for example, projection vectors E0 and E1 illustrated) are generated that are obtained by projecting the respective sides of the polygon 50 onto planes 54a, 54b, and 54c vertical to the normal vectors of the respective vertices. For example, the projection vector E0, one of the projection vectors of the vertex 52a, can be found as follows:

Edge vector connecting the vertices 52a and 52b: Eg=V1−V0
Normalized edge vector: En=normalize (Eg)
Normalized binormal vector: Tn=normalize (cross (N0, En))
Unit projection vector: E0=normalize (cross (Tn, N0))

Here, the function 'normalize' is a function for normalizing the vector by dividing it by its length, and the function 'cross' is a function for finding the outer product of two vectors. Although the above calculations allow to find the direction of a control side vector of a boundary curve of a Bezier curved surface, the length of the control side vector cannot be determined. The length thereof can be determined, for example, in the following manner. In a case where an arc is approximated by a three-dimensional Bezier curve, when the arc length becomes shorter and becomes more like a chord, the control points converge to a trisection point of the chord. Considering this, ⅓ of the side length is assumed to be the length of the control side of the Bezier curve. That is, a control point P0 is found as the side length Eglen=length (Eg) as follows:

P0=V0+⅓*Eglen*E0

The same calculations are performed for other control points. This makes it possible to generate Bezier curves corresponding to the sides. Although, in these calculations, the length of the control side vector is determined by using only the chord length, it is possible to generate a Bezier curve with a smooth variation in curvature between the curved surfaces, for example, by adding further information regarding normal vector at both end points. As one technique thereof, Japanese Patent Laid-Open Publication No. Hei 11(1999)-296686, for example, recites a method for setting a control side vector length by using a normal.

FIG. 7 illustrates control points for generating a Bezier curved surface. As illustrated in FIG. 6, six control points P021, P012, P102, P210, and P120 are determined from the relationship between the normals at the vertices 52a, 52b, and 52c of the polygon 50 and the sides thereof. Further, a control point P111 corresponding to a center portion of the polygon is generated as a control point of the curved surface. The control point P111 is found, for example, as a mean position of the six control points for the sides. It should be noted, however, that the rule for generating a control point is not limited thereto. Also, the curved surface to be generated is not limited to a Bezier curved surface and may be any one of parametric curved surfaces used in common graphics processing such as B-spline, cardinal, and a non-uniform rational basis spline (NURBS).

Also, a curved surface may be defined such that curved surfaces corresponding to polygons adjacent to each other are tangent-plane continuous. Further, a curved surface to be generated need not be a common three-dimensional parametric curved surface. For example, a curved surface may be found by expressing the distance from a point on a polygon to a corresponding point on a curved surface by a parametric interpolation formula with one variable and specifying, as points on the curved surface, points that are displaced by the applicable distance along the normal vectors of the object on the polygon found by a technique such as Phong shading.

Figure 8:
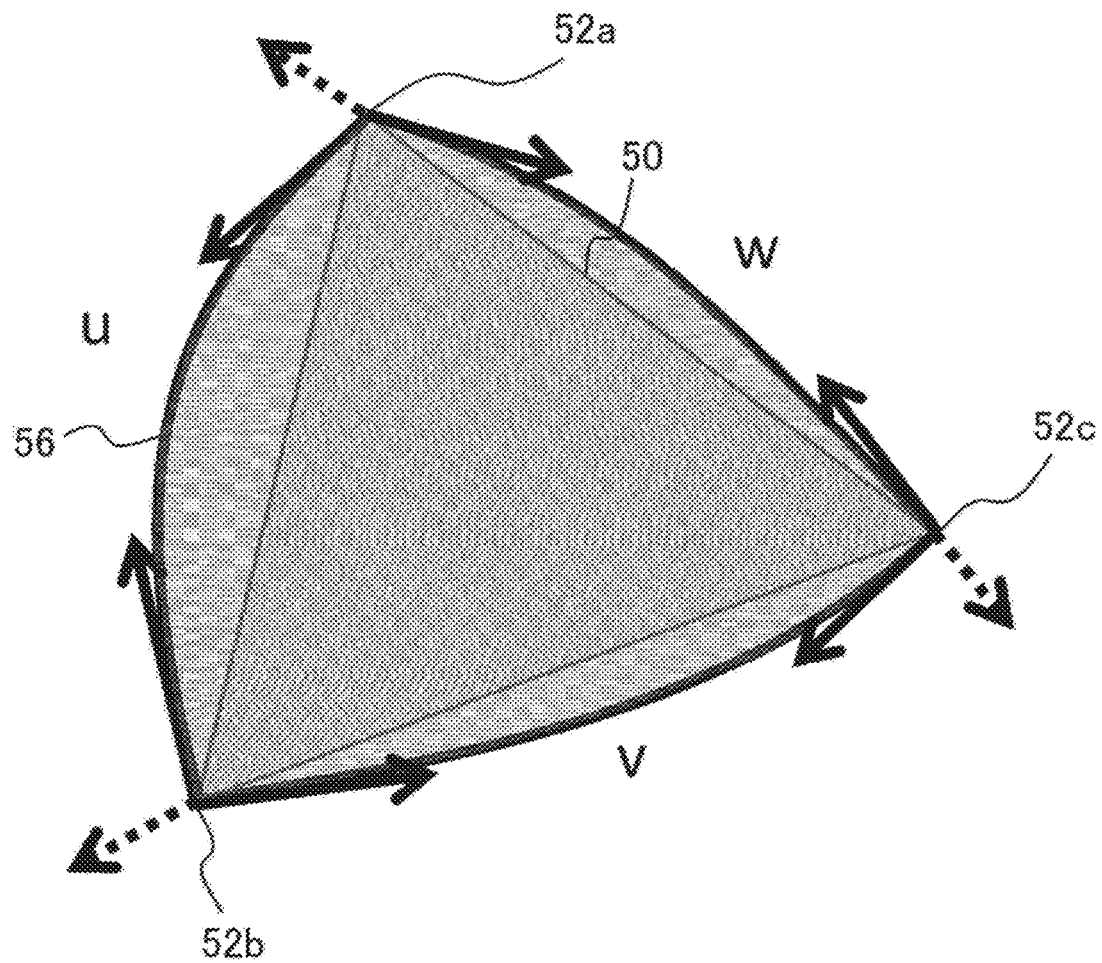
FIG. 8 is a diagram schematically illustrating a curved surface generated by control points illustrated in FIG. 7.

FIG. 8 schematically illustrates a curved surface generated by the control points illustrated in FIG. 7. As illustrated, a curved surface patch 56 is generated that is surrounded by three curves having the respective vertices 52a, 52b, and 52c of the polygon 50 as their end points. Although FIG. 8 illustrates the curved surface as seen from the front, the curved surface patch 56 actually bends vertically in the figure. Letting respective peripheries of the curved surface patch 56 generated as described above be denoted as u, v, and w axes, a position on the curved surface is represented by two-dimensional parameter coordinates (u, v, w) set on the original polygon. As with texture coordinates, each component of the parameter coordinates may take on a value from 0 to 1 and agrees with each factor of a perspectively corrected barycentric coordinate system. Also, w=1−u−v.

For example, position coordinates S (Sx, Sy, Sz) on the curved surface are found as follows from the parameter coordinates (u, v, w) by using seven control points P021, P012, P102, P201, P210, P120, and P111 illustrated in FIG. 7.

$$S = V0^*u^*u^*u + V1^*v^*v^*v + V2^*w^*w^*w + P210^*3^*u^*u^*v + \\ P120^*3^*u^*v^*v + P021^*3^*v^*v^*w + P012^*3^*v^*w^*w + \\ P102^*3^*w^*w^*u + P201^*3^*w^*u^*u + P111^*6^*u^*v^*w$$ [Math. 1]

Figure 9:
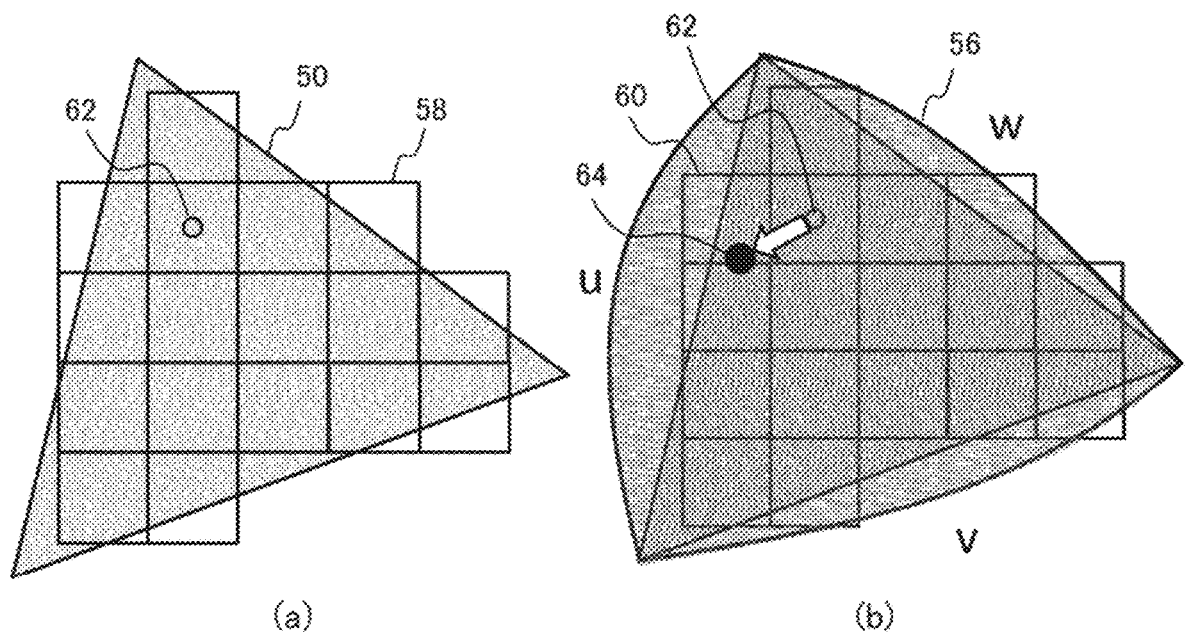
FIG. 9 depicts diagrams schematically illustrating how position coordinates are displaced on an image plane when a polygon plane is transformed into a curved surface in Embodiment 1.

Here, V0, V1, and V2 are position coordinates of the vertices of the polygon illustrated in FIG. 6. FIG. 9 schematically illustrates how position coordinates are displaced on an image plane when a polygon plane is transformed into a curved surface. The two figures illustrate the polygon 50 and the curved surface patch 56 projected on a screen. Each of a plurality of squares (for example, squares 58 and 60) represents a pixel region. A center point 62 of a certain pixel included in a projection region of the polygon 50 illustrated in (a) of FIG. 9 is displaced to a different point 64 in the projection region of the curved surface patch 56 illustrated in (b) of FIG. 9 by transforming the polygon into a curved surface.

The pixel displacement acquisition section 266 can use a texture coordinate interpolation function of a common graphic engine to acquire a positional relationship between the pixel center point 62 and the point 64 in the projection region of the curved surface patch 56. That is, when an intermediate image is generated, the parameter coordinates on the polygon 50 corresponding to the center point 62 of each pixel are found in advance by setting a texture parameter such that each parameter of the parameter coordinates described above takes on a value of 0 or 1 at each vertex of the polygon. Then, the position coordinates S (Sx, Sy, Sz) in the world coordinate system corresponding to the same parameter coordinates on the curved surface patch 56 are found by the above formula, and the point 64 on the screen at the time of projection of the position coordinates S onto the screen is found.

That is, homogeneous position coordinates Q (Qx, Qy, Qz, Qw) of the point 64 are found as follows by using a perspective transformation matrix M_IP:

$$tQ=M\_IP*tS \text{ (where } t \text{ represents the transpose of the vector)}$$

As a result, screen coordinates (sx, sy) of the point on the curved surface corresponding to the position coordinates of the polygon are obtained from the following formula:

$$sx=Qx/Qw, sy=Qy/Qw$$

This process can be performed independently for each pixel on the intermediate image plane.

Linking a primitive ID, uniquely assigned by a geometry shader for each polygon, to all corresponding pixels allows the correspondence between the polygon and the pixels to be handed down to a pixel shader. That is, by inputting corresponding pixel information and control point information to the pixel shader in association with the primitive ID, it is possible to generate an appropriate curved surface and acquire displacement of the position coordinates even if each pixel is processed independently.

It should be noted that, in order to generate a curved surface with accuracy, it is necessary to maintain an order of position coordinates of the vertices of the respective polygons estimated when the control points are acquired. However, the order is not necessarily maintained when the data is supplied from the geometry shader to the pixel shader. In order to detect this, therefore, the pixel shader verifies the relationship between each vertex and parameter by use of a function, arranges the vertices in the order estimated at the time of generation of the control points, and then acquires the parameter coordinates (u, v, w) on the curved surface corresponding to each pixel.

It should be noted that the correspondence between a point on the polygon plane and a point on the curved surface patch can also be acquired without using any one of parametric curved surfaces used in common graphics processing such as Bezier curved surface, B-spline, cardinal, and NURBS. For example, each point on the polygon plane may correspond to a position on a curved surface located in the normal direction of an object of that point. In this case, parametric curved surface interpolation is defined that derives a distance from position coordinates on the plane. Then, position coordinates on the curved surface away in the normal direction of the point by a calculated distance are acquired in the world coordinate system from a parameter coordinate position on the polygon corresponding to each pixel of the intermediate image. Projecting the position coordinates onto the screen allows position coordinates of the displacement destination on the image plane to be acquired in a similar manner to that described above.

Figure 10:
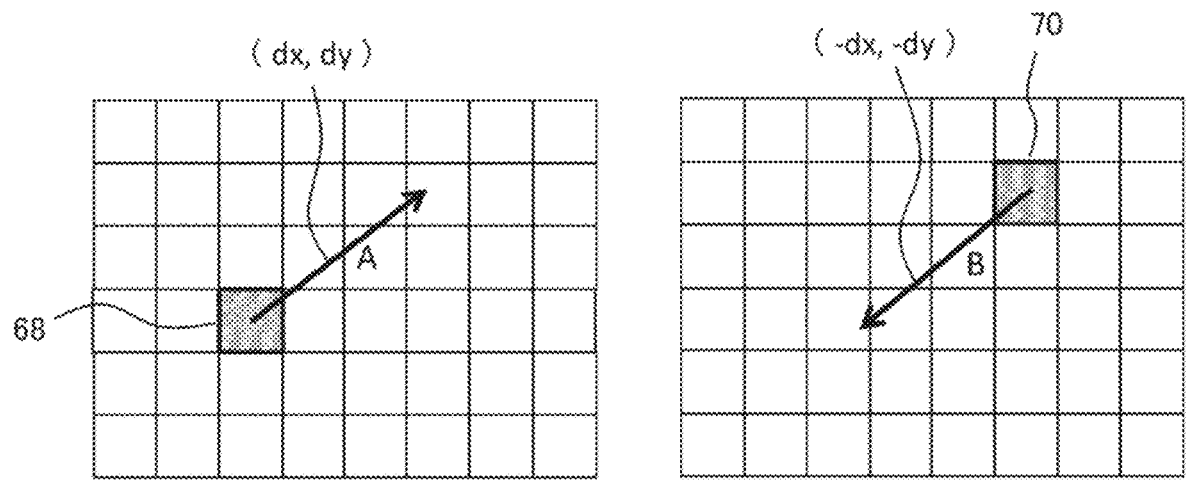
FIG. 10 depicts diagrams illustrating a relationship between a displacement vector of a pixel and a vector for finding a position on an intermediate image from a pixel of a display image when a polygon plane is transformed into a curved surface in Embodiment 1.

FIG. 10 illustrates a relationship between a displacement vector of a pixel on an intermediate image and a vector for finding a position on the intermediate image from a pixel of a display image when a polygon plane is transformed into a curved surface and projected onto a screen. The squares depicted in FIG. 10 represent the respective pixel regions on the image plane. An arrow A in (a) of FIG. 10 is a vector representing the displacement from the pixel center point 62 to the point 64 in the projection region of the curved surface patch 56 illustrated in FIG. 9. That is, a pixel 68 indicates a pixel of the intermediate image. Hereinafter, the vector in question will be referred to as a "displacement vector." Meanwhile, when a display image is drawn, as illustrated with an arrow B in (b) of FIG. 10, it is necessary to generate an inverse vector of the displacement vector having a start point at a pixel 70 of the display image and an end point at a position of the intermediate image.

Letting the respective components of the displacement vector be denoted as (dx, dy), the inverse vector has components (−dx, −dy). Hereinafter, the inverse vector in question will be referred to as an "image reference vector," and data representing the image reference vector on the image plane will be referred to as an "image reference vector map." The pixels of the image reference vector map basically correspond to the pixels of the display image. As illustrated in (b) of FIG. 10, the image reference vector is set relative to the center of the pixel of the image reference vector map. Therefore, it is necessary to determine the image reference vector in consideration of the relationship between the end point of the displacement vector and the pixel region.

Figure 11:
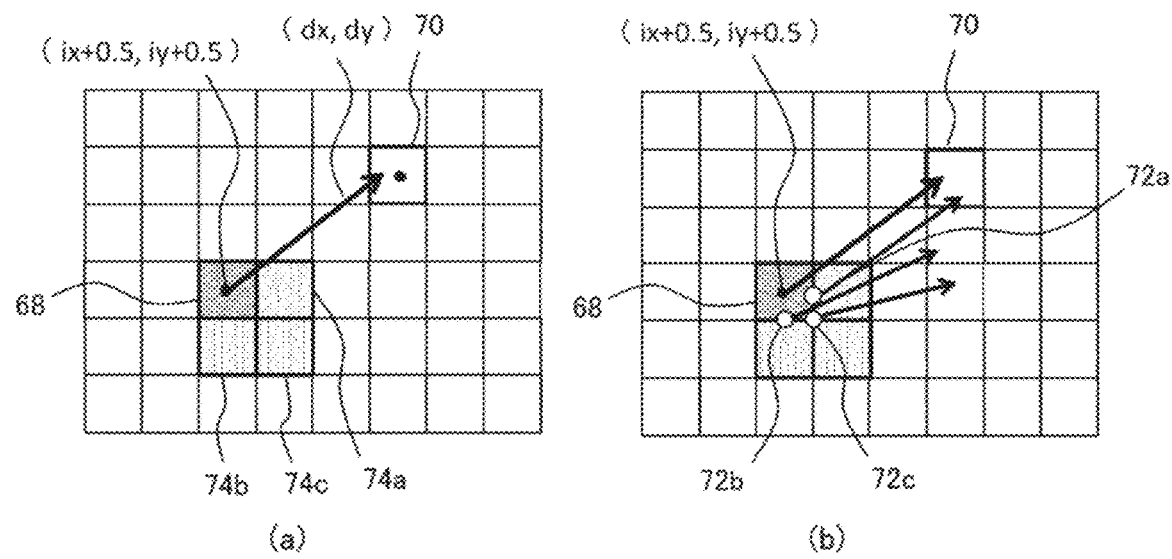
FIG. 11 depicts diagrams schematically illustrating a relationship between a displacement vector and a pixel region in Embodiment 1.

FIG. 11 schematically illustrates a relationship between the displacement vector and the pixel region. Here, each pixel is denoted by integer values such as (ix, iy)=(0, 0), (1, 0), (2, 0), and so on by using the top left position coordinates of the region as a typical point. In this case, the position coordinates of the center of the pixel region are (ix+0.5, iy+0.5)(ix, iy=0, 1, 2, . . . ).

It should be noted that, if homogeneous position coordinates Q (Qx, Qy, Qz, Qw) at the time of projection of the position coordinates S (Sx, Sy, Sz) on the curved surface patch onto the screen are found as described above, the displacement vector (dx, dy) are found as follows:

$$dx=Qx/Qw-ix$$

$$dy=Qy/Qw-iy$$

If the position coordinates (ix+0.5, iy+0.5) of the center of the certain pixel 68 in the intermediate image as illustrated in (a) of FIG. 11 are displaced by the displacement vector (dx, dy), the position coordinates of the end point thereof are often out of position in relation to the center of the pixel 70 of the displacement destination. Therefore, a pixel may be selected by rounding the position coordinates (ix+0.5+dx, iy+0.5+dy)=(Qx/Qw+0.5, Qy/Qw+0.5) of the end point off to the nearest whole number, and a vector having components (−dx, −dy) that starts from the center of the pixel in question may be specified as a pixel reference vector.

It should be noted, however, that, in this case, error of up to 0.5 pixels may occur both vertically and horizontally as a displacement amount of the original displacement vector from the end point. For this reason, surrounding displacement vectors are considered in subpixel units. Specifically, in addition to the displacement from the position coordinates (ix+0.5, iy+0.5) of the center of the pixel 68 of interest, displacements from a point 72a (ix+1.0, iy+0.5), a point 72b (ix+0.5, iy+1.0), and a point 72c (ix+1.0, iy+1.0) that are away from the center in question by half a pixel to the right, half a pixel down, and half a pixel to the right and half a pixel down, respectively, are found as illustrated in (b) of FIG. 11.

The displacement vectors having these points as start points are found by reading out and interpolating the displacement vectors acquired for the pixels 74a, 74b, and 74c that are to the right, down, and to the right and down from the pixel 68 of interest. Then, respective integer values representing the displacement destination pixels are acquired by adding the displacement vectors to the position coordinates of the respective points to calculate the position coordinates of the end points and rounding down the decimal places thereof. It should be noted that intervals at which to acquire displacement vectors are not limited to half a pixel's worth of length and are acceptable as long as they are shorter than the length of one side of the pixel region. Also, in a case where dispersion of end points of the displacement vectors of adjacent pixels is greater than a given criterion, the intervals at which to acquire displacement vectors may be narrowed or adaptively switched in other way. It should be noted that it is presumably highly likely that this dispersion will be large in a case where the original polygon is significantly inclined relative to the image plane. Therefore, the inclination angle of the original polygon relative to the image plane may be detected so that the larger the inclination angle, the more the intervals at which to acquire displacement vectors are narrowed.

Figure 12:
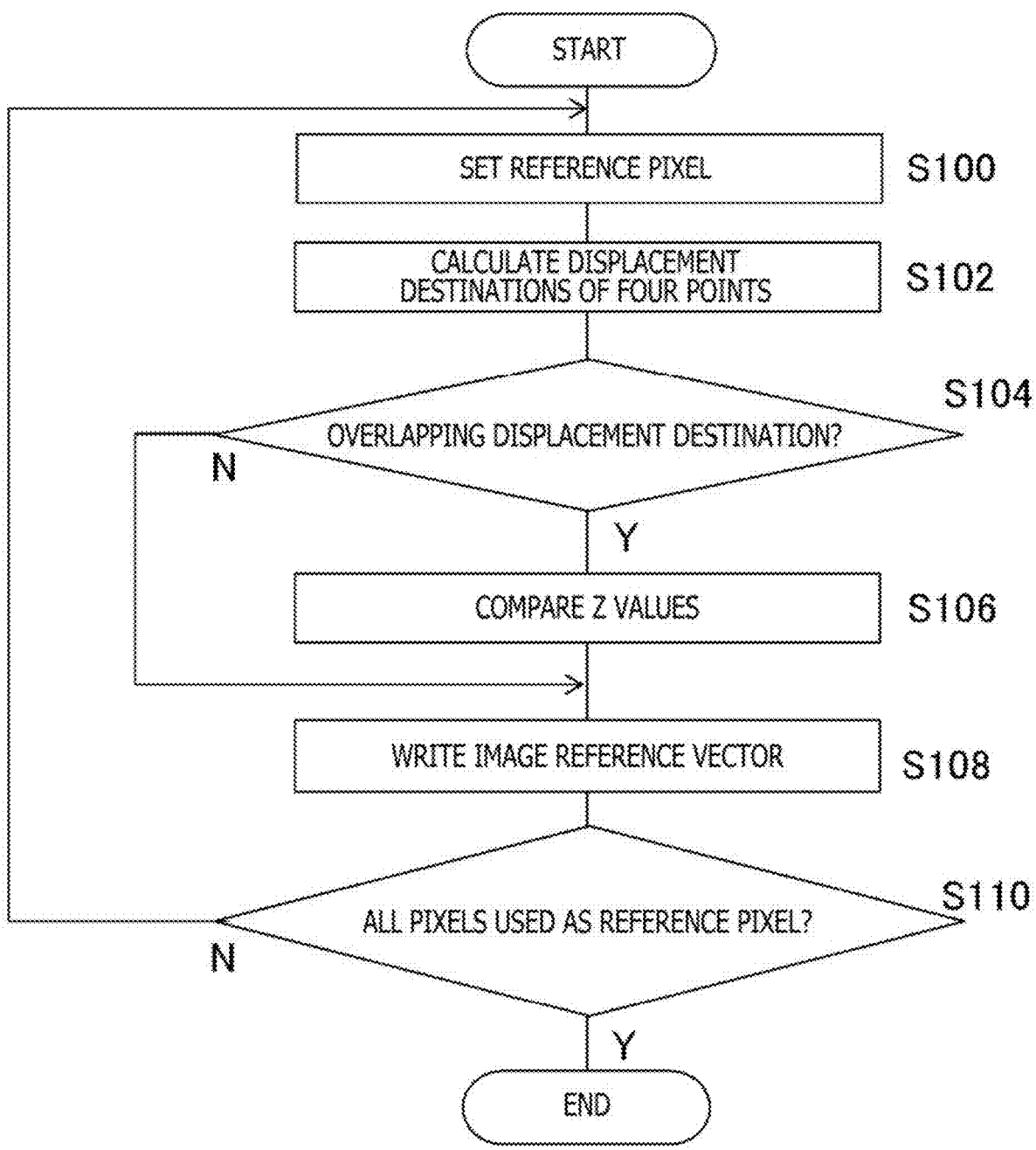
FIG. 12 is a flowchart illustrating an outline of a processing procedure for determining an image reference vector for each pixel on an image reference vector map in Embodiment 1.

In the example illustrated, the end points of the two displacement vectors overlap at the pixel 70. In this case, the displacement vector closer to the virtual camera is selected by comparing Z values representing the distances of the object from the virtual camera. The Z values are also found by interpolating the values that have been acquired for the original pixels 68, 74a, 74b, and 74c. It should be noted that the term Z value here refers to a value after the displacement resulting from the transformation of a polygon into a curved surface that is acquired when the displacement vector is acquired. FIG. 12 is a flowchart illustrating an outline of a processing procedure for determining an image reference vector for each pixel on an image reference vector map. First, one of the pixels on the image plane of an intermediate image is set as a reference pixel (S100), and displacement destinations are calculated for a total of four points, namely, a center and three nearby points (S102).

It is verified whether or not the displacement destination pixels overlap (S104), and in a case where an overlap occurs, the Z values thereof are compared (Y in S104 and S106). Then, an inverse vector of the displacement vector having a Z value closer to the virtual camera is written as an image reference vector of the pixel of the displacement destination in question (S108). If the displacement destinations do not overlap in S104, inverse vectors of the displacement vectors are written in an 'as-is' manner as reference vectors of the pixels of the displacement destinations in question (N in S104 and S108). It should be noted that the destination written in S108 may be overwritten as a result of comparison between Z values in the event of overlap between the displacement destinations during subsequent calculations for the reference pixel. As a result, a buffer memory for an image reference vector map is used as a writing destination.

While all the pixels corresponding to the object of interest have yet to be specified as a reference pixel (N in S110), the processes from S100 to S108 are repeated, and the processes are terminated when all the pixels have been specified as a reference pixel (Y in S110). Finding displacement vectors in subpixel units and selecting image reference vectors thereafter as described above provides uniformity in accuracy as compared to a technique that determines image reference vectors by finding a displacement vector for each pixel and interpolating the displacement vectors. It has been discovered, as a result of verification of the displacement vectors at a distance of 0.5 pixels, that the maximum error at the reference destination positions of the image reference vectors is 0.25 pixels, thus ensuring improved accuracy.

Figure 13:
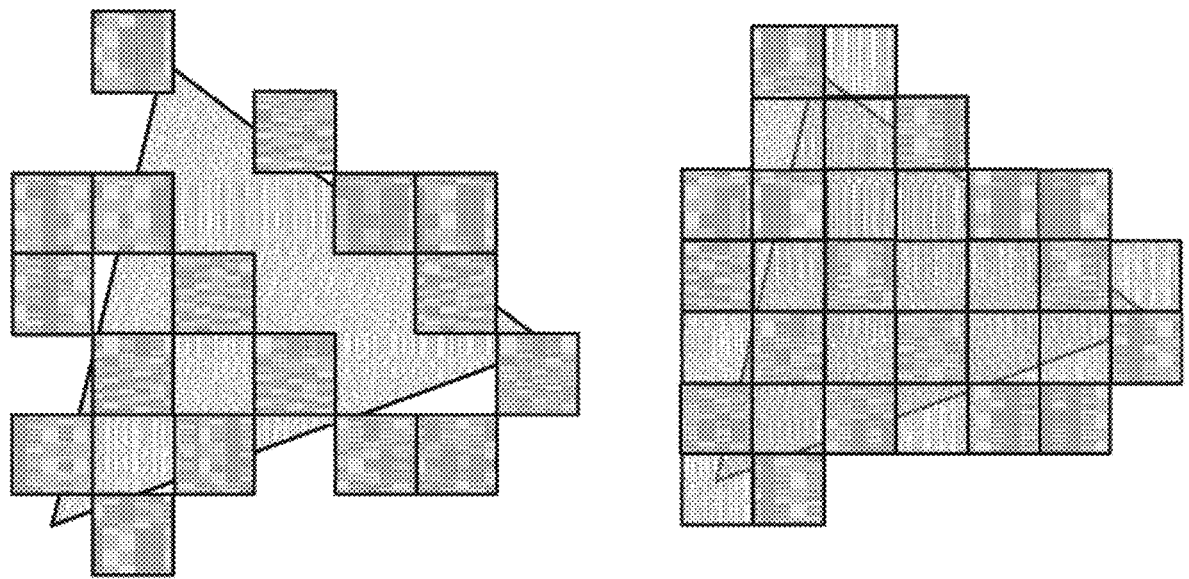
FIG. 13 depicts diagrams schematically illustrating pixels having image reference vectors set for a polygon in Embodiment 1.

FIG. 13 schematically illustrates pixels having image reference vectors set for a polygon. As described above, image reference vectors are acquired by finding displacement destination pixels resulting from the transformation of a polygon into a curved surface by using a pixel center and its nearby points on an intermediate image as start points. Such a procedure may possibly result in pixels with no image reference vectors (hereinafter may be referred to as "holes") as a result of separation of the start and end points even if the two points are close on the intermediate image. (a) of FIG. 13 illustrates only those pixels for which image reference vectors are set as shaded rectangles.

Finding displacement vectors in units smaller than a pixel and creating more end points than pixels as described above keeps the occurrence of holes to a minimum. However, even such an attempt may lead to a pixel that does not fit into a category of an end point, and by extension, a hole. For this reason, the pixel displacement acquisition section 266 sets image reference vectors for all the polygons of the object of interest by the above technique first, and then interpolates the image reference vectors by using the surrounding pixels for those pixels that remain as holes as illustrated in (b) of FIG. 13 as gray rectangles.

Figure 14:
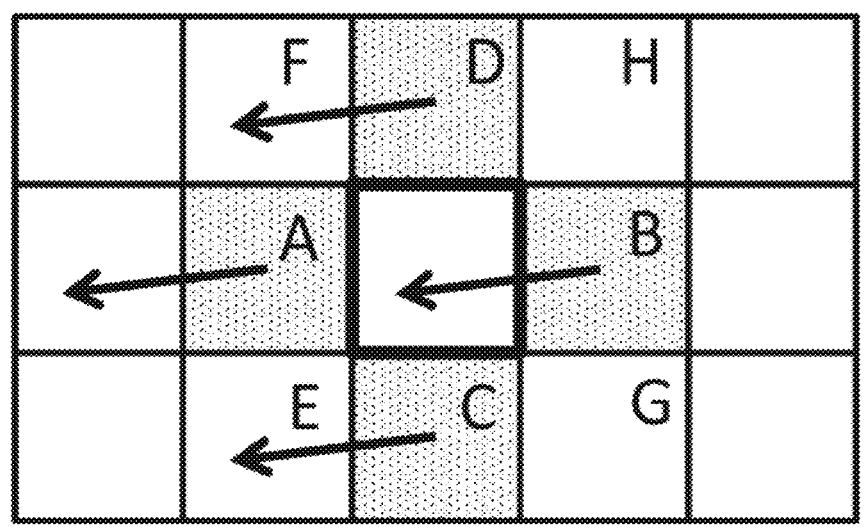
FIG. 14 is a diagram for describing an interpolation technique for the image reference vectors in Embodiment 1.

FIG. 14 is a diagram for describing an interpolation technique for the image reference vectors. We assume that there is an image reference vector hole in the pixel surrounded by a bold frame in the pixel layout illustrated in FIG. 14. In this case, the simplest of all would be to perform interpolation by using mean values of the image reference vectors set in the surrounding pixels. For example, when image reference vectors as indicated by arrows are given to the pixels above, below, and to the left and right (pixels D, C, A, and B) of the target bold frame pixel, a mean vector of these four image reference vectors is used as an image reference vector of the target.

Alternatively, the image reference vectors may be averaged by varying an assigned weight in accordance with the position relative to the target pixel. For example, a weighted mean is calculated on the image reference vectors of eight pixels A to H by assigning, of the eight surrounding pixels, a two-fold weight to the upper, lower, left, and right pixels (pixels D, C, A, and B). Alternatively, pixels and weights used for interpolation may be determined in accordance with the directions of the image reference vectors. For example, in the example illustrated, the image reference vectors of the surrounding pixels are all close to be horizontal. It can be presumed from this that the portions in question have been stretched horizontally from the intermediate image and that the holes have occurred as a result thereof.

In this case, therefore, highly accurate interpolation responsive to the situation can be realized by carrying out linear interpolation with the left and right pixels A and B of the pixels surrounding the target and performing averaging with a larger weight assigned to these pixels. For example, a mean vector of the image reference vectors of the pixels above, below, and to the left and right of the target pixel is found, and when an angle θ formed by the mean vector and the image horizontal direction (X-axis direction) is $-30°<\theta<30°$ or $150°<\theta<210°$, the image reference vectors of the left and right pixels A and B are averaged for use as an image reference vector of the target.

When the angle θ is $60°<\theta<120°$ or $240°<\theta<300°$, an image reference vector of the target is found by averaging the image reference vectors of the upper and lower pixels D and C. When the angle θ is other than the above, an image reference vector of the target is found by averaging the image reference vectors of the upper, lower, left, and right pixels. It should be noted that various combinations of modes such as thresholds for angles and whether or not to select pixels for interpolation or vary weights in response thereto as described above are possible. In the present embodiment, it is possible to select a calculation formula on the basis of directionality by including, among targets to be interpolated, vectors even if such local stretching arises.

Also, actual operation on color values is limited to a final stage of drawing a display image, thus keeping possible adverse effects of this interpolation process on the display image quality to a minimum. For example, in a case where color images are directly interpolated without introducing image reference vectors, adjustments cannot be made on the basis of directionality as described above. That is, even if a hole is produced as a result of stretching in one direction, a color image does not have that information. Therefore, similar interpolation calculations are carried out irrespective of the direction of stretching. This may lead to mixture of unnecessary colors, possibly resulting in adverse effects also on the display image quality.

Because of their property of representing the movement of pixels by means of deformation of polygon surfaces, image reference vectors do not undergo large pixel-by-pixel changes as illustrated in FIG. 14. As a result, image reference vectors do not readily produce large errors even if the surrounding pixels of the target are used for interpolation irrespective of the directionality, thus preventing deterioration of the image quality attributable to color mixture. It should be noted that the above interpolation technique has been premised that so-called legitimate image reference vectors derived from displacement vector calculations are given to the surrounding pixels. Meanwhile, in a case where two or more pixels are continuously holes, an image reference vector that is not an interpolation vector may be searched for in the surrounding pixels, so that the image reference vector in question may be used in an 'as-is' manner for interpolation.

In FIG. 14, for example, an order of search priority is established as a rule for the eight surrounding pixels of the target. A possible example of order would be pixels A, B, C, D, E, F, G, and H. Then, a search is made in that order, and the first image reference vector detected that is not an interpolation vector is used as a vector of the target. No matter which interpolation technique is used, because no color value has yet to be finalized in the stage of generating an image reference vector, a color value can be eventually determined with subpixel accuracy in position. It should be noted that the smaller the intervals at which to generate displacement vectors, the more the occurrence of holes can be prevented as described above.

Qualitatively, the greater the angle of the polygon relative to the screen, the more likely it is for holes to occur. Therefore, if the intervals at which to generate displacement vectors are narrowed in accordance with the angle in question, it is possible to reduce pixels whose image reference vectors need to be interpolated. The angle in question can also be estimated by monitoring the change in reduction rate attributable to the angle formed by the polygon's normal and the projection vector heading to the virtual camera when the polygon is projected onto a plane. In this case, the larger the reduction rate attributable to the angle, the more the intervals at which to generate displacement vectors need be narrowed.

Figure 15:
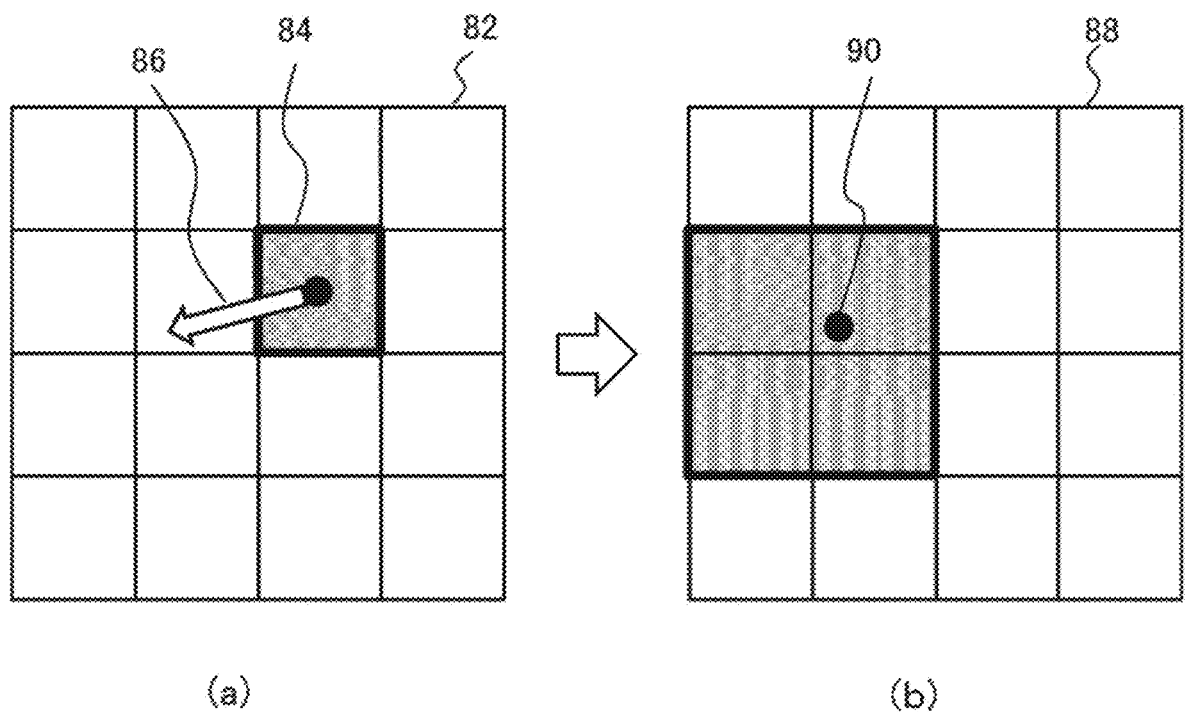
FIG. 15 depicts diagrams for describing a sampling technique for color values when a drawing section draws a display image in Embodiment 1.

FIG. 15 depicts diagrams for describing a sampling technique for color values when the drawing section 268 draws a display image in S20 in FIG. 5. The squares illustrated represent a pixel region of a display image 82 in (a) of FIG. 15 and a pixel region of an intermediate image 88 in (b) of FIG. 15. The drawing section 268 acquires, for each pixel of the display image 82, an image reference vector associated with the pixel in question by referring to an image reference vector map. In the example illustrated, an image reference vector 86 is acquired for a pixel 84.

Next, intermediate image data is read out from the intermediate image storage section 260, and position coordinates 90 corresponding to the end point of the image reference vector 86 in question are identified. Then, filtering is performed by using color values of the pixels located within a given range including the position coordinates 90, thus determining a color value. The color value in question is used as a color value of the pixel 84 of the original display image. A bilinear filter using four pixels in two rows by two columns shaded in (b) of FIG. 15 is, for example, a possible choice for filtering. It should be noted, however, that various techniques are available for color value filtering, and any of such techniques may be used. The object in question can be represented at high quality by determining a color value for each of all the pixels corresponding to the polygon included in the object of interest as described above.

Figure 16:
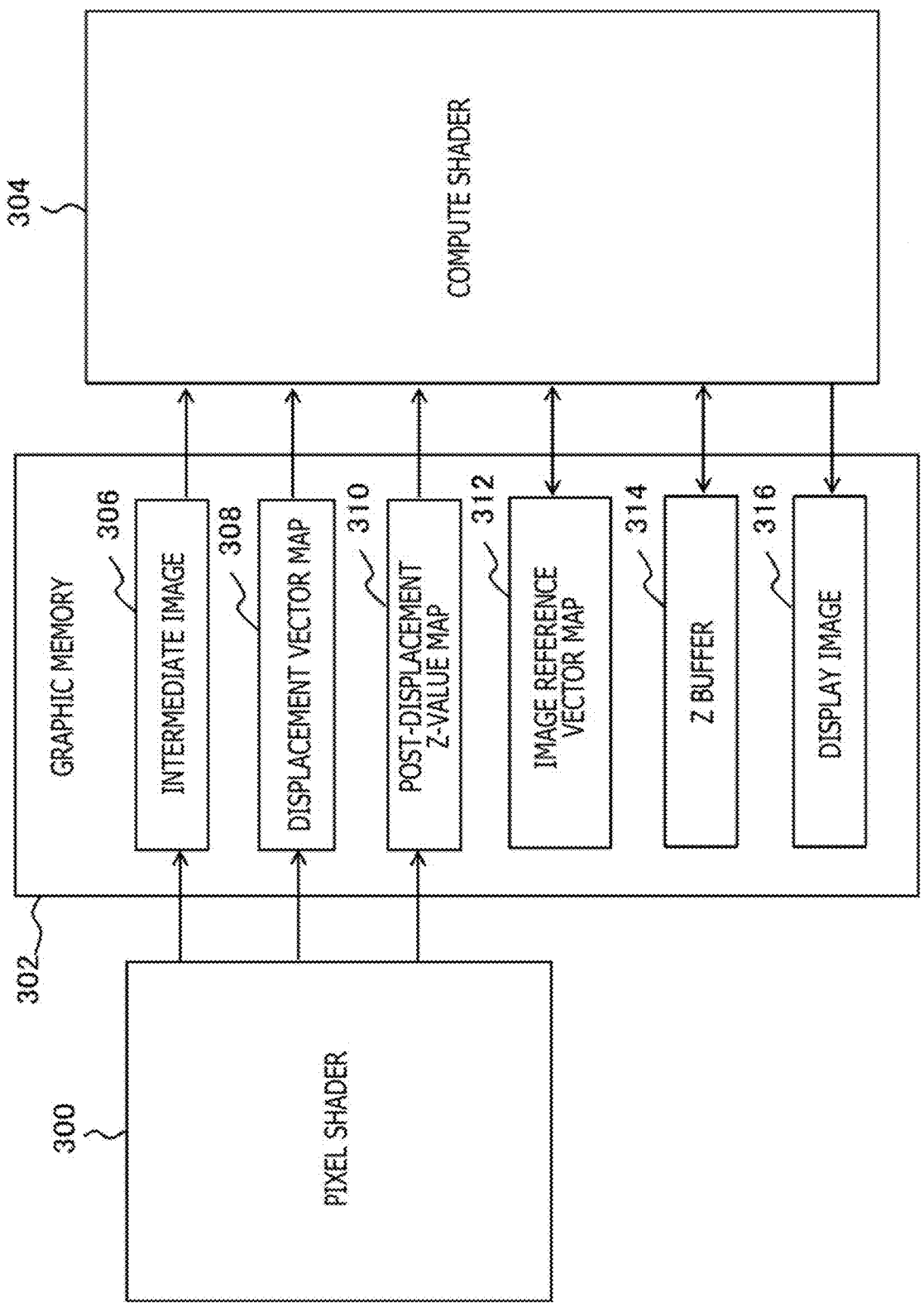
FIG. 16 is a diagram illustrating a relationship between various types of data and main processing units in a case where an existing graphics pipeline is used in Embodiment 1.

FIG. 16 illustrates a relationship between various types of data and main processing units in a case where an existing graphics pipeline is used. A pixel shader 300 processes data, pixel by pixel, of an intermediate image, and a compute shader 304 generates pixel-by-pixel information of a display image from the pixel-by-pixel information of the intermediate image. It should be noted that respective image planes of an intermediate image, an image reference vector map, and a display image can be generated independently of each other and that resolutions thereof may be the same or different.

Also, intermediate data generated by these processes is stored in a graphic memory 302. At this time, the pixel shader 300 generates an image plane corresponding to a pixel layout of the intermediate image by using a multiple render target (MRT) mechanism. The MRT is a common mechanism for generating a plurality of pieces of image data on a single occasion of the drawing process. First, the pixel shader 300 realizes the function of the intermediate image generation section 256, storing, in an image plane on the MRT, data of an intermediate image 306 drawn by a common procedure to depict an object that includes a polygon on a plane.

Also, the pixel shader 300 acquires coordinates (u, v, w) on the polygon corresponding to the pixel to be processed, and by extension, the coordinates on the curved surface patch by using the functions of the curved surface generation section 264 and the pixel displacement acquisition section 266, acquiring displacement vectors by identifying the two-dimensional position coordinates when the coordinates on the curved surface patch are projected onto the screen. A displacement vector map 308 is generated by writing the displacement vectors to the image plane on the MRT. At the same time, the pixel shader 300 acquires a Z value of the position coordinates (u, v, w) on the curved surface patch and also writes the Z value to the image plane on the MRT, thus generating a post-displacement Z-value map 310.

The compute shader 304 generates, in accordance with the function of the pixel displacement acquisition section 266, an image reference vector map on an image plane corresponding to the display image by using the displacement vector map 308 and the post-displacement Z-value map 310. This process basically writes inverse vector data to the end point pixel of the displacement vector map. At this time, in a case where there are a plurality of displacement vectors having the same pixel as their end points, the inverse vector of the displacement vector closer to the virtual camera is written by referring to the post-displacement Z-value map 310.

Also, as illustrated in FIG. 11, the end point is verified in subpixel units by interpolating the displacement vectors acquired in the displacement vector map 308 for the respective pixels. The processes illustrated in FIG. 11 are performed by successively moving the pixel of interest. Therefore, the compute shader 304 needs to generate a Z buffer 314 that represents Z values on the same image plane. Further, as described with reference to FIGS. 13 and 14, the compute shader 304 completes an image reference vector map 312 by interpolating the holes of the image reference vector map 312.

Then, the compute shader 304 acquires, in accordance with the function of the drawing section 268, an image reference vector corresponding to each pixel of the display image from the image reference vector map 312, determining a color value at the end point position of the intermediate image 306 or a color value acquired by filtering the surrounding color values thereof as a color value of the pixel of interest. This allows a display image 316 to be generated. It should be noted that, in a case where different resolutions are used for the image reference vector map 312 and the display image, the image reference vector corresponding to the pixel of the display image may be also found through filtering by using the surrounding image reference vectors on the map.

Also, in a case where the same resolution is used for the display image and the image reference vector map, and at the same time, in a case where the holes in the image reference vector map are negligible, it is possible to omit the process of generating the image reference vector map 312. That is, for each pixel of the display image, a displacement vector that is the end point of that pixel is acquired from the displacement vector map 308, and, of these, the start point of the displacement vector whose post-displacement Z value indicates that the vector is closest to the virtual camera is found. Then, the color value of the start point in question is acquired from the intermediate image 306.

The compute shader 304 processes, in parallel, the displacement vectors of a total of four points, namely, the center of the pixel of interest and three nearby points illustrated in FIG. 11, writing inverse vectors to the end point pixel. Treating this process as one unit, image reference vectors of the pixels corresponding to the polygon are filled in, while at the same time, shifting the pixel of interest. At this time, if a condition occurs in which parallel output results are written to the same pixel at the same time, there is a possibility that data having the Z value that should otherwise be written cannot be written and that an erroneous image reference vector may be written. For this reason, a two-step process is used in which a Z buffer is completed in such a manner as to maintain consistency and in which an image reference vector map is generated by using the Z buffer.

Figure 17:
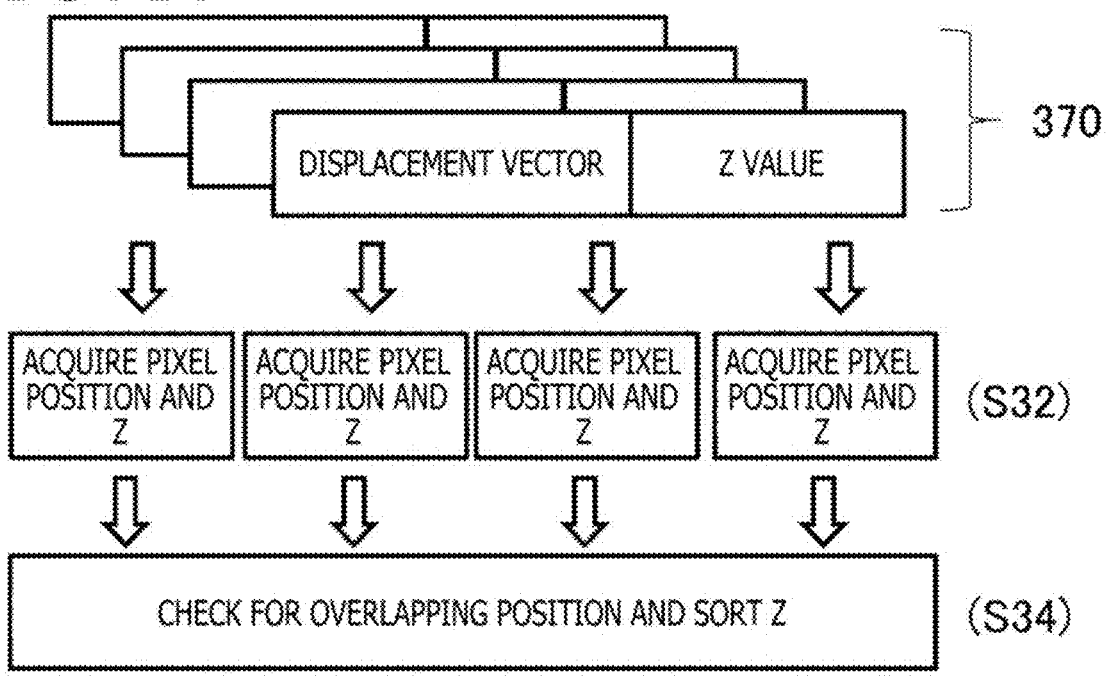
FIG. 17 is a diagram illustrating a processing procedure for writing to a Z buffer in order for a compute shader to generate an image reference vector in Embodiment 1.

FIG. 17 illustrates a processing procedure for writing to a Z buffer in order for the compute shader 304 to generate an image reference vector. First, the compute shader 304 reads out data 370 indicating displacement vectors and their Z values at the pixels to the right, below, and to the right and below the pixel of interest, interpolates the displacement vectors by using the data 370, and then adds the displacement vectors to the position coordinates of the start points, thus acquiring pairs of a pixel position including an end point and a Z value (S32). These processes are performed in parallel as described above. Then, the compute shader 304 verifies whether or not the end point output earlier is the same pixel as the end point output later, and if this is the case, the compute shader 304 sorts the results in order of closer to the virtual camera (S34).

The displacement destination pixels are left as they are if there are no overlapping pixels. When all the results are available, the compute shader 304 writes the Z value closest to the virtual camera to the end point pixel of the Z buffer 314 (S36). At this time, of indivisible operations, an "AtomicMin" instruction can be used to write the Z value closest to the virtual camera from a plurality of shader engines at the same time. The compute shader 304 completes the Z buffer 314 by performing this process on all the target pixels. If the displacement vectors of points are located at distances smaller than the width of a pixel from each other as depicted in FIG. 11, the displacement destination pixels thereof are highly likely to overlap. Therefore, excess pixel information can be effectively eliminated by comparing the Z values within the shader, thus contributing to a reduced number of accesses to the Z buffer 314.

Figure 18:
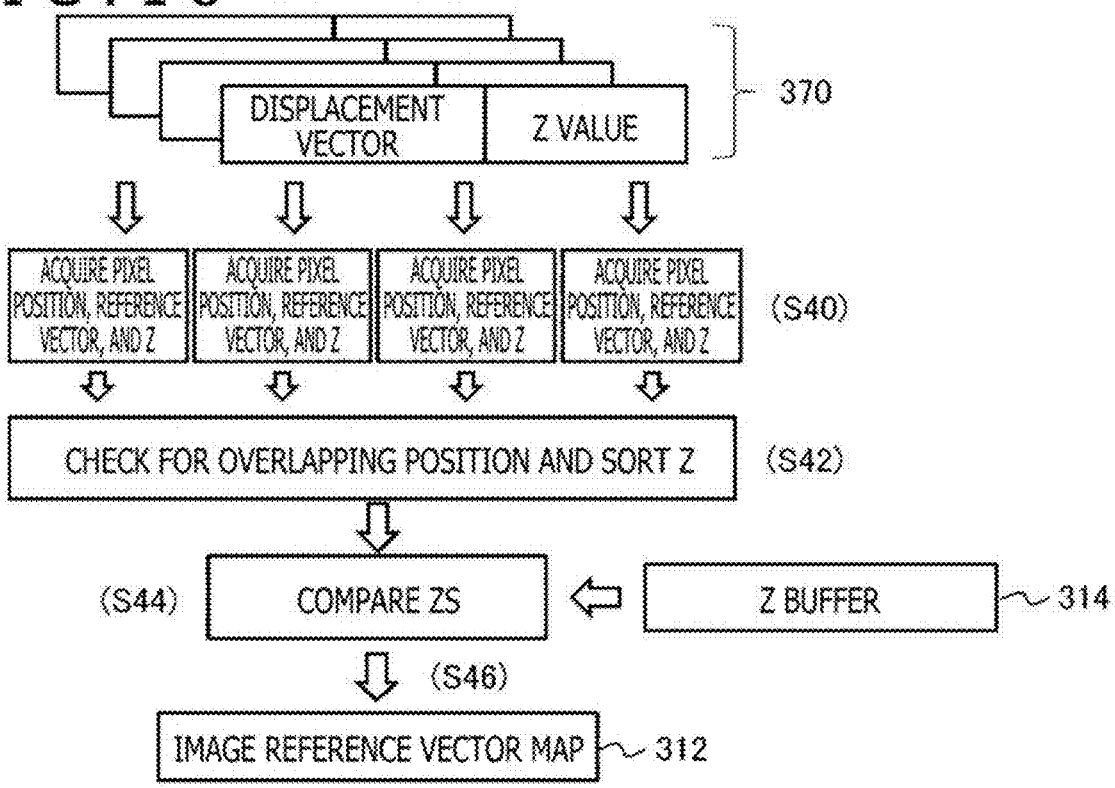
FIG. 18 is a diagram illustrating a processing procedure for the compute shader to write an image reference vector in Embodiment 1.

FIG. 18 illustrates a processing procedure for the compute shader 304 to write an image reference vector. First, the compute shader 304 reads out the data 370 indicating displacement vectors and their Z values at the pixels to the right, below, and to the right and below the pixel of interest, interpolates the displacement vectors by using the data 370, and then adds the displacement vectors to the position coordinates of the start points, thus acquiring sets of a pixel position including an end point, an image reference vector which is an inverse vector of the displacement vector, and a Z value (S40). Then, if the end point pixel overlaps, the compute shader 304 determines a candidate image reference vector for each end point pixel by sorting the results by the Z value as with S34 in FIG. 17 (S42).

Further, the compute shader 304 compares the Z value of the pixel in question in the Z buffer 314 that has already been generated with the Z value of the candidate image reference vector to be written (S44), and if the Z value of the candidate image reference vector to be written matches the Z value in the Z buffer 314, the compute shader 304 writes the image reference vector to the pixel in question of the image reference vector map 312 (S46). This allows a suitable image reference vector based on the Z value to be selected and written irrespective of the order of output even if the image reference vector acquisition process is carried out in parallel.

Figure 19:
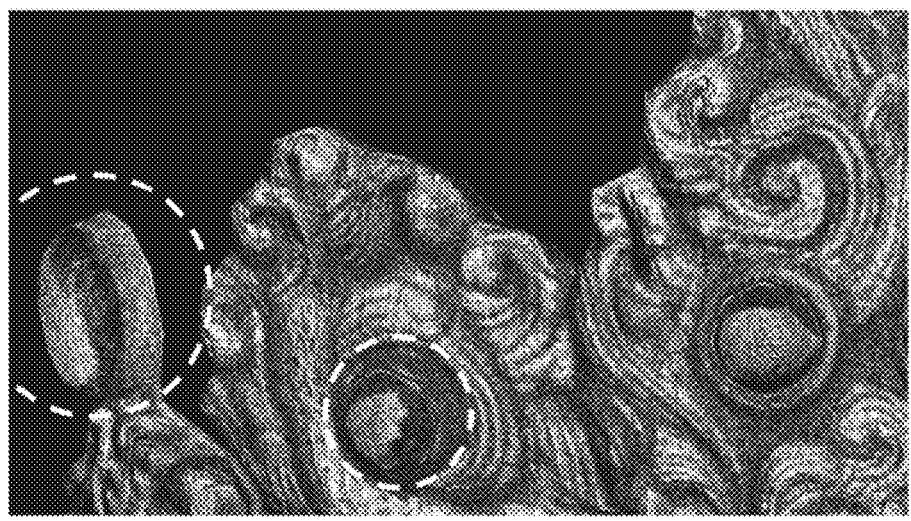
FIG. 19 depicts diagrams comparing a conventional technology with Embodiment 1 by using actually acquired images.
Figure 19:
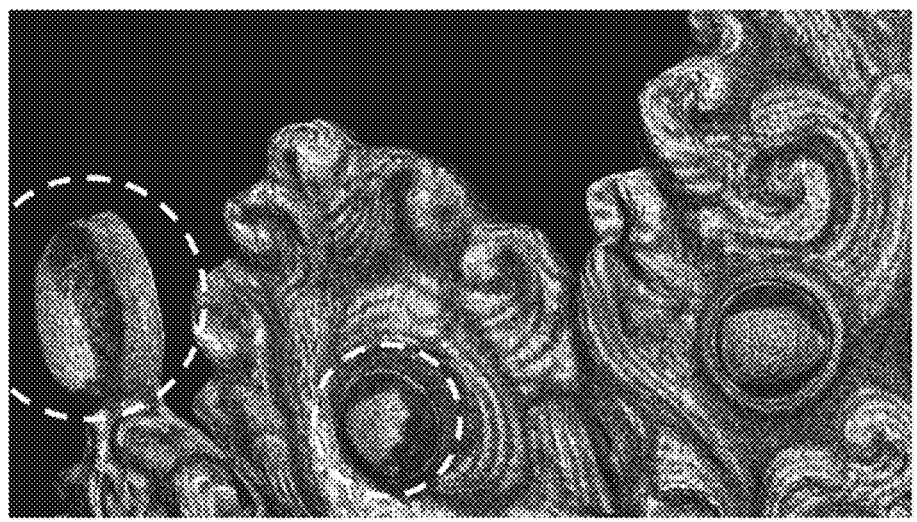

FIG. 19 compares an existing technology with the present embodiment by using actually acquired images. (a) of FIG. 19 illustrates an image that depicts a planar polygon as usual, and (b) of FIG. 19 illustrates an image drawn by transforming a polygon into a curved surface and shifting pixels by the present embodiment. Particularly in portions enclosed by white dotted lines and so on, the outline of the object illustrated as discontinuous in (a) of FIG. 19 turns into a smooth curve in (b) of FIG. 19. Also, the shape of a protruding portion as seen from a diagonal direction is accurately represented.

It should be noted that, in the description given so far, an image reference vector map having an image reference vector set for each pixel of the display image is prepared first followed by sampling of color values of the intermediate image on the basis of the image reference vector map. This configuration makes it possible to interpolate the image reference vectors, thus ensuring setting of an image reference vector for each of all the pixels representing the object's silhouette. In contrast, in a case where there is no need to interpolate the image reference vectors, the generation of an image reference vector map may be omitted.

In this case, it is only necessary to find an image reference vector for each pixel of the display image on the basis of a displacement vector resulting from the transformation of a polygon into a curved surface in a similar manner to the above and then directly sample the color values of the intermediate image by using the image reference vectors. Possible examples that do not require interpolation of the image reference vectors are a case where an object is drawn that has an angle or shape that does not readily produce "holes" when the object is transformed into a curved surface and a case where a color or region is drawn that does not readily deteriorate even if a post-sampling color value itself is interpolated. Also in this case, processing performed by a shader program includes processing handled by the pixel shader program and by the compute shader program to be executed.

In the embodiment described above, when a three-dimensional object is drawn, a curved surface is generated for a polygon included in the object, thus acquiring a positional relationship between a position on the polygon and a position on the curved surface. Then, the image generated by using the planar polygon is displaced in accordance with the positional relationship in question, thus generating a display image. Such a procedure allows the shape itself to be changed artificially unlike a technology of attaching texture to the planar polygon and representing three-dimensionality on the texture in question, thus making it possible to generate an image that offers higher quality in every detail. Because a curved surface shape is substantially represented, it is unlikely that the discontinuity of the outline will be visually identified as a result of magnification of the object.

Because the above change in shape is accomplished mostly by the pixel movement on the image plane, computational processing on the vertices in the three-dimensional space will not increase. Therefore, it is possible to significantly suppress the load of processing the vertices and the load of rasterizing the polygon as compared to the case of drawing a high-definition image by subdividing a polygon. That is, it becomes possible to quickly reflect the displacement of each point on the plane of the polygon included in a three-dimensional object to a final image without generating a new subdivided polygon. Also, color values of the display image can be effectively determined by generating inverse vectors of the vectors representing displacements of the pixels as an image reference vector map. In interpolation operation for the image reference vector map, pixel displacement characteristics can be taken into consideration by interpolating the color values. Moreover, unnecessary color mixture that tends to take place during image processing is not likely to occur because the color values are not directly processed.

Also, a series of processes including displacement vector calculation, generation of an image reference vector map, and drawing of a display image can all be carried out pixel by pixel. Therefore, architectures that have been used in computer graphics in the past can be employed in an 'as-is' manner, thus realizing a fast drawing process with minimal barriers to introduction.

Embodiment 2

Figure 20:
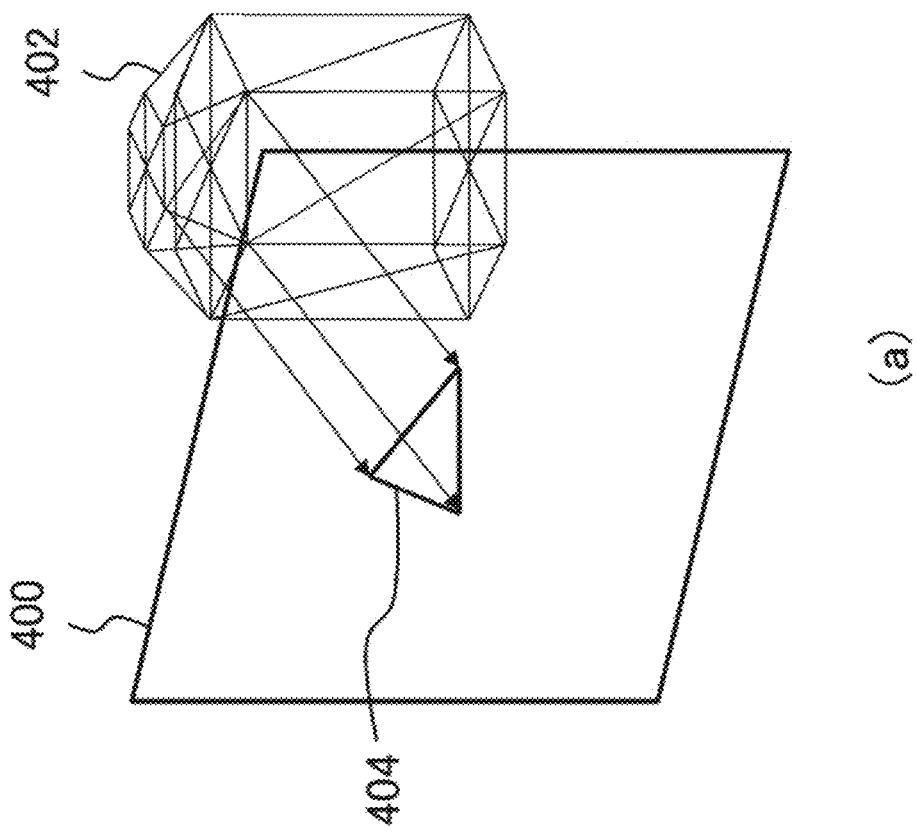
FIG. 20 depicts diagrams schematically illustrating a relationship between an intermediate image and a virtual camera's screen in Embodiment 1.
Figure 20:
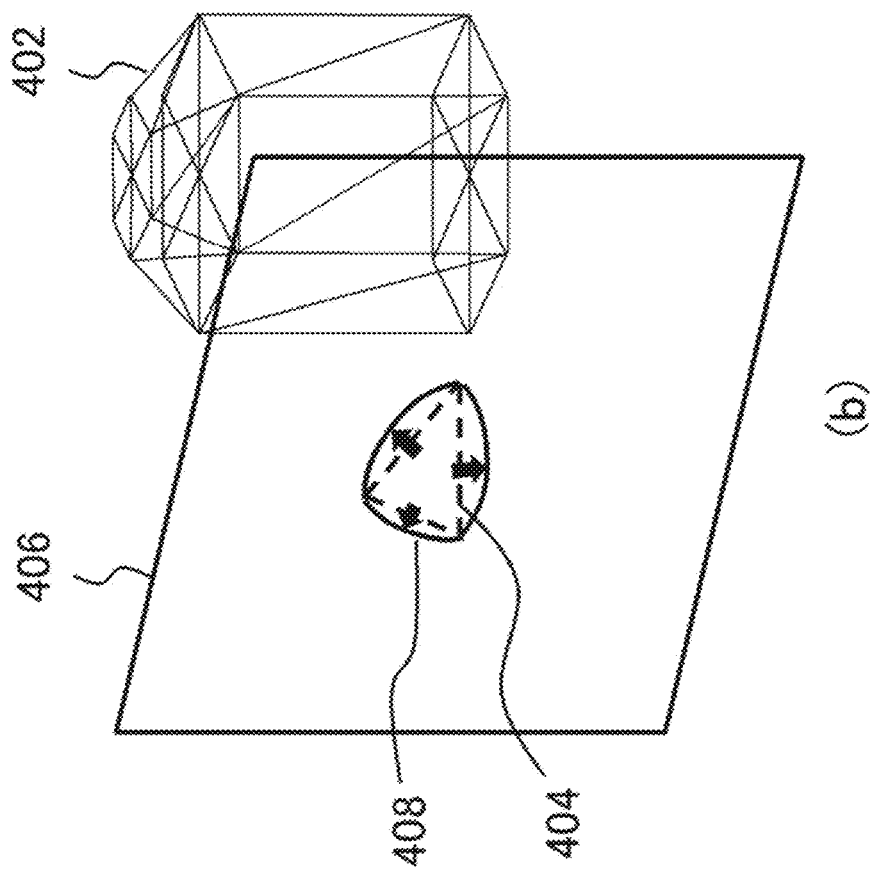

In Embodiment 1, an intermediate image has been basically generated on the same plane as the virtual camera's screen. FIG. 20 schematically illustrates a relationship between an intermediate image and a virtual camera's screen in Embodiment 1. In this case, the intermediate image generation section 256 projects a polygon of an object 402 onto a plane 400, the same plane as the virtual camera's screen, as illustrated in (a) of FIG. 20. In FIG. 20, a silhouette 404 is illustrated that is obtained by projecting a polygon. Then, an intermediate image is generated on the plane 400 by determining color values of the pixels included in the silhouette through texture mapping or other technique.

Meanwhile, the display image generation section 258 finds the position coordinates S (Sx, Sy, Sz) on the curved surface patch in the world coordinate system from the parameter coordinates (u, v, w) of each pixel included in the polygon silhouette 404 and projects the position coordinates S onto a screen 406 of the virtual camera as illustrated in (b) of FIG. 20, thus acquiring a silhouette 408 resulting from the transformation of the polygon into a curved surface. It should be noted that the vector that traces back the displacement from the original pixel at this time is an image reference vector. The object silhouette resulting from the transformation of the polygon into a curved surface is drawn by sampling, with the image reference vector, the color values of the pre-displacement intermediate image.

Figure 21:
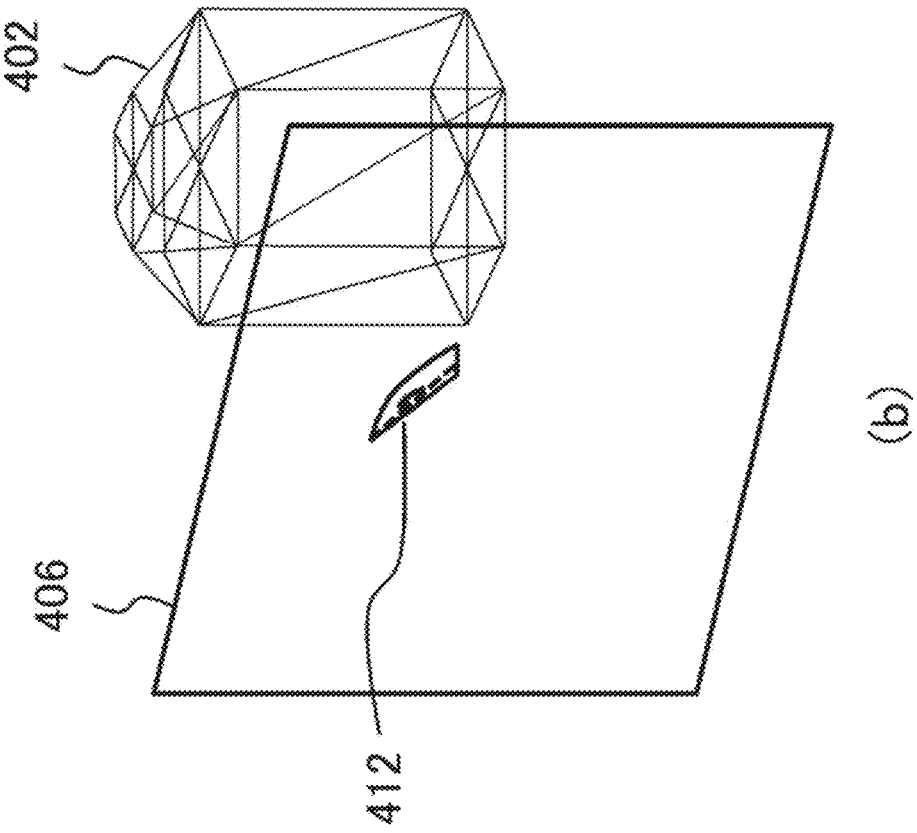
FIG. 21 depicts diagrams schematically illustrating another example of a relationship between an intermediate image and a virtual camera's screen in Embodiment 1.
Figure 21:
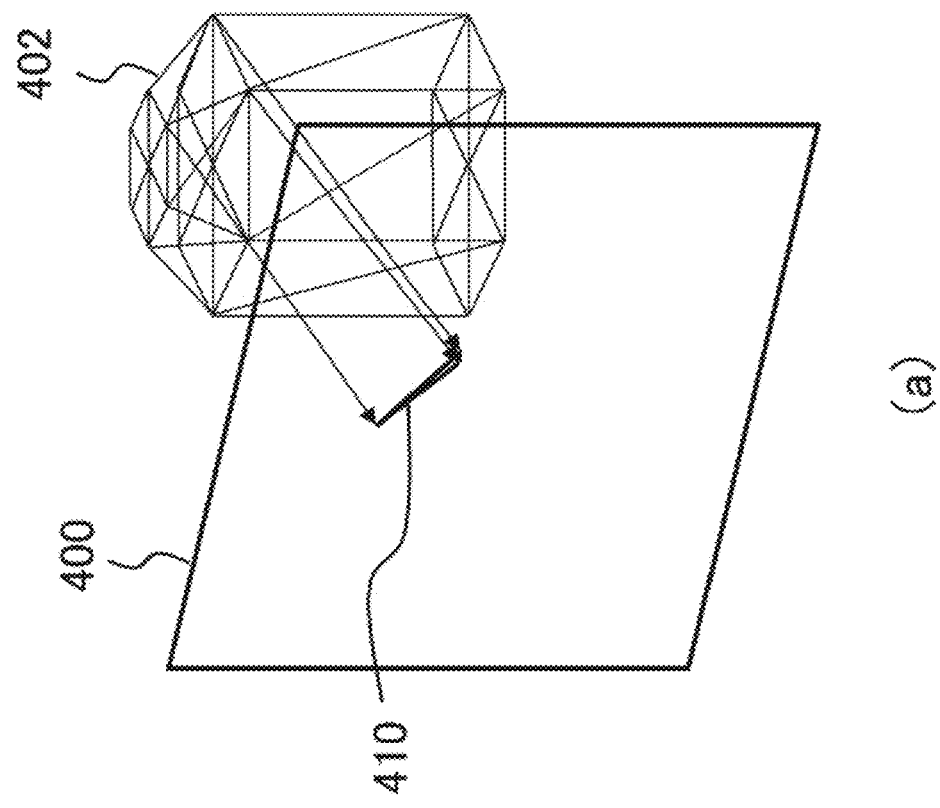

FIG. 21 depicts diagrams schematically illustrating another example of the relationship between the intermediate image and the virtual camera's screen in Embodiment 1. Although the processing procedure is similar to that in FIG. 20, a polygon silhouette 410 is significantly smaller in area in the intermediate image on the plane 400 illustrated in (a) of FIG. 21. As described above, the closer the line of sight of the virtual camera is to being parallel to the polygon plane, the smaller the area of the polygon silhouette. If the silhouette 410 of the intermediate image is small in area, the region of a silhouette 412 expands as a result of the transformation of the polygon into a curved surface as illustrated in (b) of FIG. 21. Even if the color values thereof are determined through interpolation of the image reference vectors, the sampling destination pixels are limited. As a result, the image quality may vary or change in the event of a change in line of sight.

Figure 22:
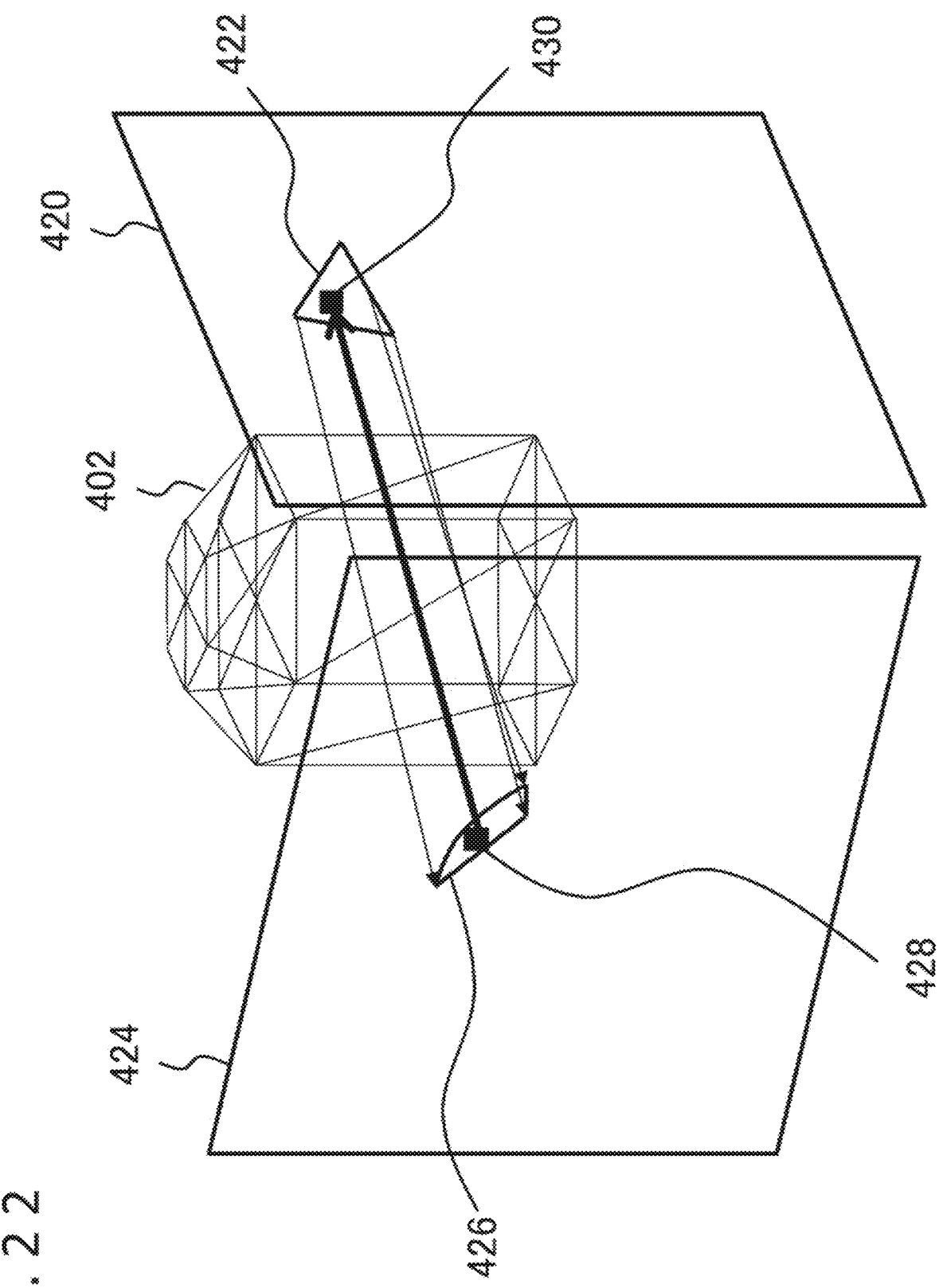
FIG. 22 is a diagram schematically illustrating a relationship between an intermediate image and a virtual camera's screen in Embodiment 2.

For this reason, in the present embodiment, an intermediate image plane is set independently of the virtual camera's screen. The image display system and the image generation apparatus may be similar in configuration to those described in Embodiment 1. Therefore, only differences from those of Embodiment 1 will be described. FIG. 22 schematically illustrates a relationship between an intermediate image and a virtual camera's screen in Embodiment 2. In this embodiment, the intermediate image generation section 256 sets a plane 420 for generating an intermediate image independently of a screen 424 of the virtual camera, thus projecting a polygon of the object 402 onto the plane 420 in question. In FIG. 22, a silhouette 422 is illustrated that is obtained by projecting a polygon. Then, an intermediate image is generated by determining color values of the pixels included in the silhouette through texture mapping or other technique.

The display image generation section 258 finds the position coordinates S (Sx, Sy, Sz) on the curved surface patch in the world coordinate system from the parameter coordinates (u, v, w) of each pixel included in the polygon silhouette 422 in the intermediate image and projects the position coordinates S onto the screen 424 of the virtual camera, thus acquiring a silhouette 426 resulting from the transformation of the polygon into a curved surface. In this case, the sampling destination for determining a color value of each pixel of the silhouette 426 is an intermediate image generated on the plane 420 provided separately. That is, an image reference vector to a sampling destination 430 on the plane 420 of the intermediate image is acquired for each pixel 428 of the screen 424. The image reference vector itself need only be two-dimensional information. Therefore, the image reference vectors can be found by similar calculations to those illustrated in FIG. 12 in Embodiment 1.

One or a plurality of the planes 420 may be provided for the intermediate image. For example, planes may be provided in such a manner as to surround the object 402 or a space to be displayed such that the plane on which the silhouette is largest in area is selected as a sampling destination for each polygon. Also, one of the intermediate image planes may match the virtual camera's screen. For example, an intermediate image is generated on the same plane as the virtual camera's screen as in Embodiment 1, and only those polygons whose silhouettes are smaller than a given value may be represented on a plane having a different angle or at a different position where their silhouettes are larger than the given value for use as an intermediate image.

Also, if a positional relationship between pixels before and after the transformation of a polygon into a curved surface is known, a polygon silhouette may be represented larger by generating an intermediate image through parallel projection by taking advantage of the fact that the appearance of the intermediate image does not affect the display result. As described above, the size of the polygon silhouette 422 can be maintained favorably by setting at least one intermediate image plane 420 independently of the position or posture of the virtual camera. This makes it possible to draw an image more robust to the change in line of sight.

Figure 23:
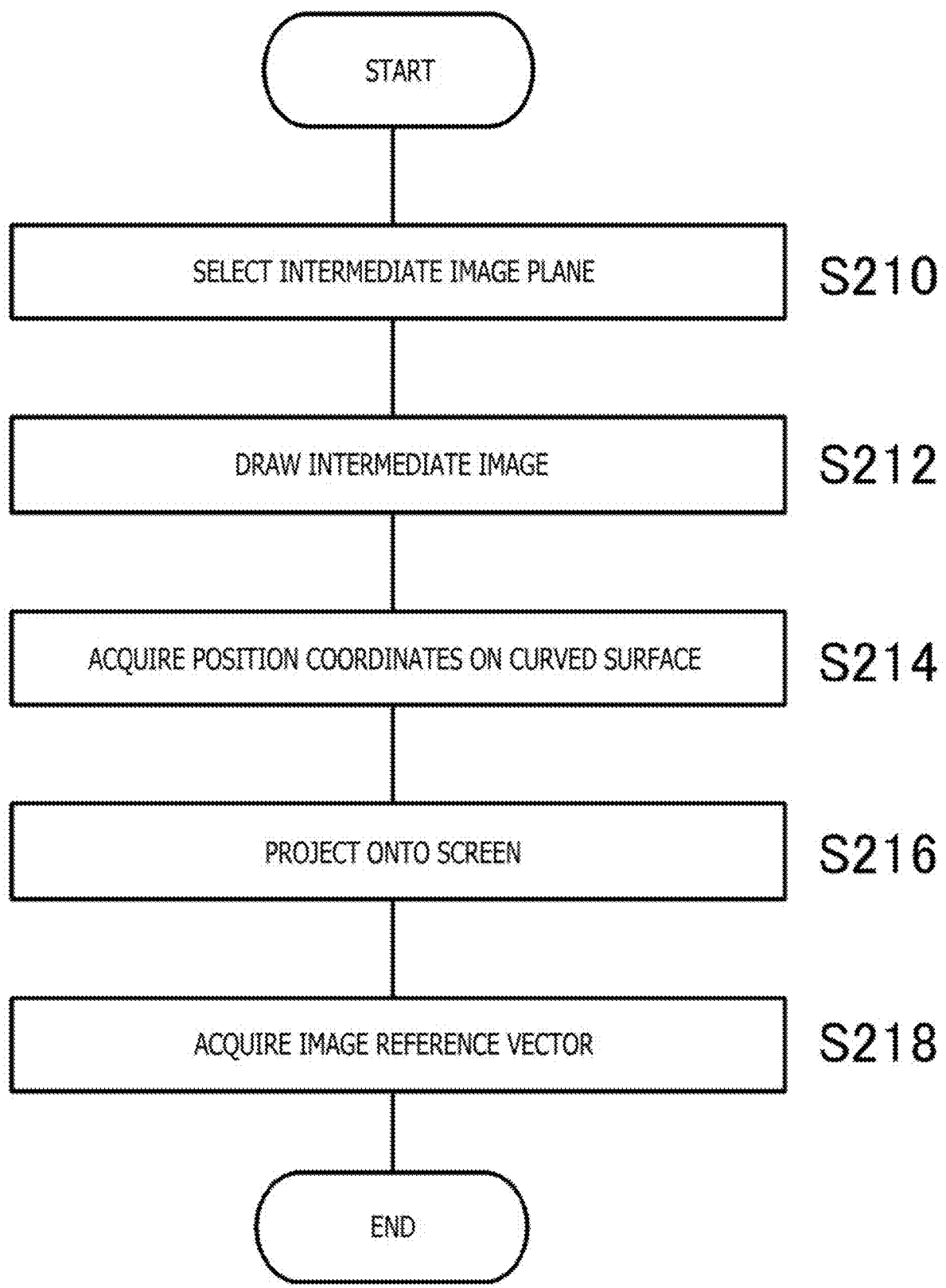
FIG. 23 is a flowchart illustrating a processing procedure for an intermediate image generation section and a display image generation section to generate an intermediate image and an image reference vector map.

FIG. 23 is a flowchart illustrating a processing procedure for the intermediate image generation section 256 and the display image generation section 258 to generate an intermediate image and an image reference vector map in Embodiment 2. These processes are performed in place of S16 and S18 in the flowchart illustrated in FIG. 5 in Embodiment 1. First, the intermediate image generation section 256 selects, of a plurality of candidate planes having at least a different angle or position, a plane where the polygon is represented largest in area, as an intermediate image plane (S10).

A plane may be shared by all the polygons or the plurality thereof. Alternatively, a polygon may be selected for each polygon. In the former case, a plane where the mean area of the plurality of polygon silhouettes is largest may be selected, for example. Also, a plane set in advance may be used as a fixed plane. In that case, the process in step S210 can be omitted.

Next, the intermediate image generation section 256 draws an intermediate image by projecting a polygon onto the selected plane and determining color values by a common technique (S212). In a case where a different plane is selected for each polygon, a plurality of intermediate images are generated as a matter of course. Next, the pixel displacement acquisition section 266 of the display image generation section 258 acquires the position coordinates S (Sx, Sy, Sz) on a curved surface resulting from the transformation of a polygon into the curved surface from the parameter coordinates (u, v, w) corresponding to each pixel of the intermediate image as described in Embodiment 1 (S214).

In a case where the graphics pipeline illustrated in FIG. 16 in Embodiment 1 is used, the pixel shader 300 represents, by using MRT, data that represents the position coordinates S on the curved surface patch for each pixel of the intermediate image, rather than the displacement vector map 308. Also, the pixel shader 300 does not generate the post-displacement Z-value map 310 in this stage. Next, the pixel displacement acquisition section 266 projects the position coordinates S on the curved surface onto the virtual camera's screen (S216). That is, the pixel displacement acquisition section 266 converts the position coordinates S in the world coordinate system into the homogeneous position coordinates Q on the screen by using the perspective transformation matrix M_FP as follows:

$$tQ=M\_FP*tS$$

It should be noted that the perspective transformation matrix M_FP at this time is determined independently of the perspective transformation matrix for transformation to the intermediate image and by the position and posture of the virtual camera. At this time, the distance from the screen to the position coordinates S is found and represented on the intermediate image plane. That is, the post-displacement Z-value map 310 illustrated in FIG. 16 is acquired in this stage. The displacement vectors from the respective pixels of the intermediate image to the positions on the screen can be acquired as a result of the above process. Hereinafter, therefore, an inverse vector having a start point at each pixel of the screen is found as an image reference vector as in Embodiment 1 (S218). An image reference vector map is generated by representing the inverse vectors on the screen plane.

In this process, not only an image reference vector but also identification information of the intermediate image referred to by the image reference vector are associated with each pixel of the screen. This ensures that the drawing section 268 can carry out sampling from the appropriate intermediate image when determining color values of the display image. Also, in a process of S218, selection of image reference vectors by using Z values and interpolation of holes may be carried out as appropriate in a similar manner to that described in Embodiment 1. Also, if there is no need for interpolation, the process of generating an image reference vector map may be omitted, so that the intermediate image may be directly referred to after finding the image reference vectors.

In the present embodiment described above, when a three-dimensional object is drawn, a curved surface is generated for a polygon included in the object, and a relationship between a position on the polygon and a position on the curved surface is acquired. Then, a display image is generated by displacing the image generated by using the planar polygon in accordance with the positional relationship in question. At this time, a pre-displacement image plane is set independently of a viewpoint. This makes it possible to not only provide the effect achieved in Embodiment 1 but also prevent deterioration of the quality of the display image generated as a result of reference made to the pre-displacement polygon silhouette that has crumbled under an effect of the viewpoint. As a result, it is possible to continuously draw a high-quality image that offers excellent robustness regardless of a situation.

The present invention has been described above based on embodiments. The above embodiments are illustrative, and it is to be understood by those skilled in the art that combinations of components and processing processes can be modified in various ways and that such modification examples also fall within the scope of the present invention.

Figure 24:
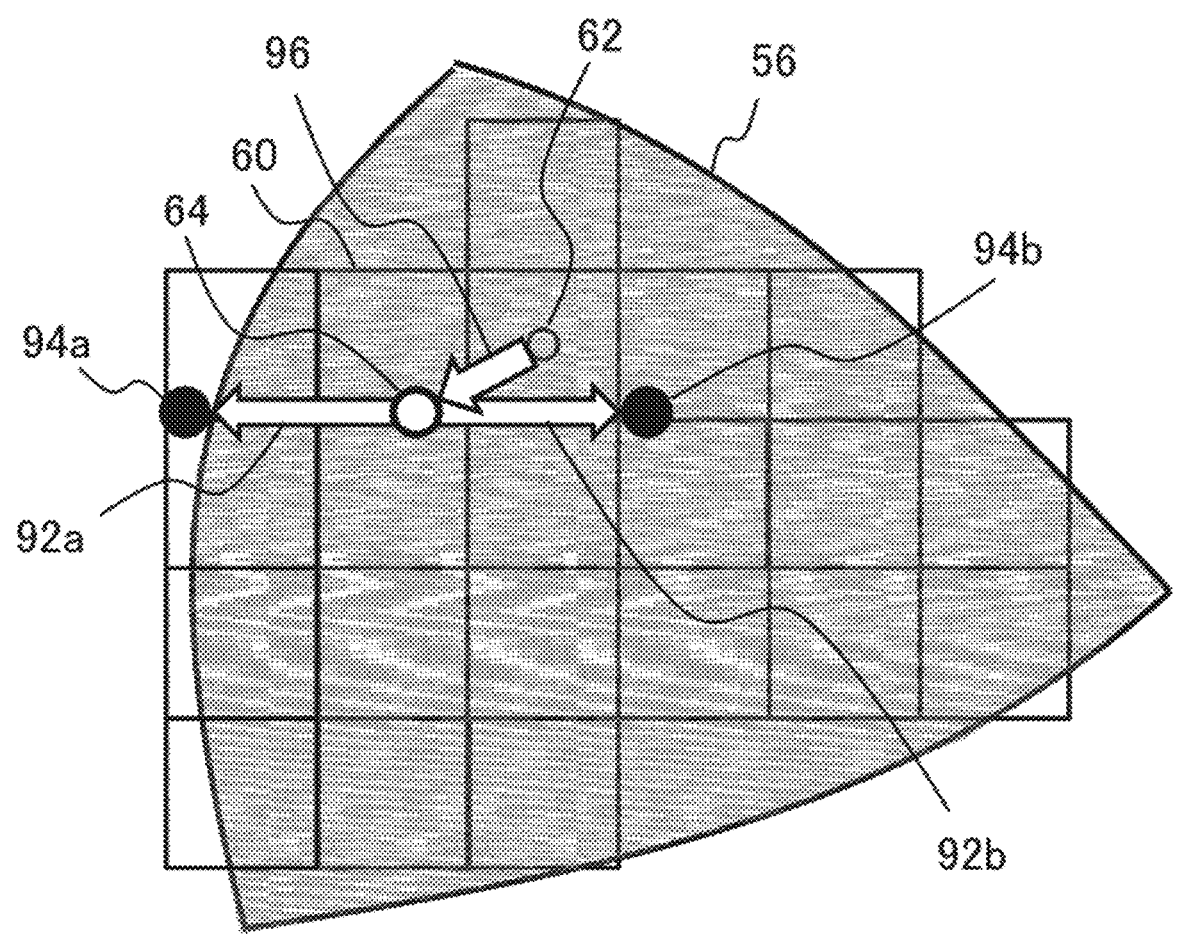
FIG. 24 is a diagram for describing how position coordinates are displaced on an image plane when stereo images are generated in a modification example of Embodiments 1 and 2.

For example, a polygon included in an object model for representing a more realistic shape in Embodiments 1 and 2 is a curved surface, and image reference vectors based on displacement of pixels as a result thereof are introduced. However, the purpose of processing is not limited thereto. One possible example would be application to a technology for allowing stereoscopic viewing of an object by displaying stereo images with parallax for right and left eyes. FIG. 24 is a diagram for describing how position coordinates are displaced on an image plane when stereo images are generated. FIG. 24 illustrates, as with (b) of FIG. 9, that the curved surface patch 56 is projected onto the screen, and each of the plurality of squares (for example, squares 60) represents a pixel region.

Also, as illustrated in FIG. 9, we assume that the center point 62 of a certain pixel has been displaced to the different point 64 as a result of the transformation of a polygon into a curved surface. When stereo images are generated, the point 64 that has been displaced as described above is further displaced horizontally on the image plane. In FIG. 24, a leftward displacement vector 92a and a rightward displacement vector 92b are displacement vectors resulting from parallax of right and left eyes, respectively. In this example, we assume that the viewpoint of the intermediate image is located at a midpoint between right and left eye viewpoints. Therefore, displacement vectors horizontally pointing in opposite directions and having the same length are generated. One of the viewpoints of the two eyes may be used as a viewpoint of the intermediate image, and a displacement vector may be generated to generate an image having the other viewpoint.

In any case, the lengths of the displacement vectors 92a and 92b are inversely proportional to the Z value of the object. Therefore, by setting a function for finding the lengths of the displacement vectors from the Z value in advance, it is possible to find each of the displacement vectors 92a and 92b resulting from parallax by using the post-displacement Z-value map 310 illustrated in FIG. 16.

Then, the displacement vectors for right and left eye images can be found, respectively, by adding the displacement vectors 92a and 92b resulting from parallax to a displacement vector 96 resulting from the transformation of a polygon into a curved surface. Displacement vector maps for right and left eyes can be generated by performing this addition process on each of the pixels of the displacement vector map 308 illustrated in FIG. 16. Then, display images for right and left eyes can be generated with a small amount of calculations by generating image reference vector maps and determining color values of the display images on the basis of the respective maps in a similar manner to that described in the present embodiment. Alternatively, a final reference vector may be found by finding an image reference vector based on the transformation of a polygon into a curved surface and an image reference vector based on parallax and combining the two vectors.

It should be noted that, however, if stereo images are generated from a single intermediate image, the stereo images fall short of representing a difference in luminance attributable to a difference in left and right viewpoints. For this reason, intermediate images for right and left eyes representing the difference in luminance in question may be generated beforehand, thus generating display images having respective viewpoints by using image reference vector maps that refer to the respective intermediate images. In this case, there is no need to calculate a significant displacement based on parallax as illustrated in FIG. 24. That is, it is only necessary to add parallax correction displacement vectors for subtle movements of the left and right viewpoints to the displacement vector resulting from the transformation of a polygon into a curved surface. As a result, a single calculation of image reference vectors can achieve both curved surface correction and parallax correction of stereo images at the same time.

Figure 25:
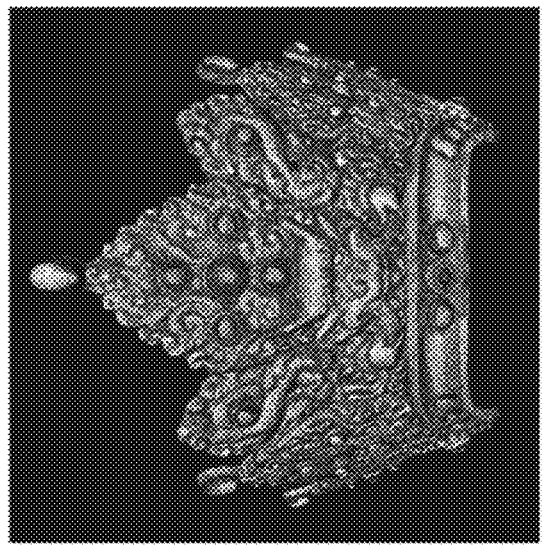
FIG. 25 depicts diagrams illustrating images processed by introducing the image reference vector in Embodiments 1 and 2.
Figure 25:
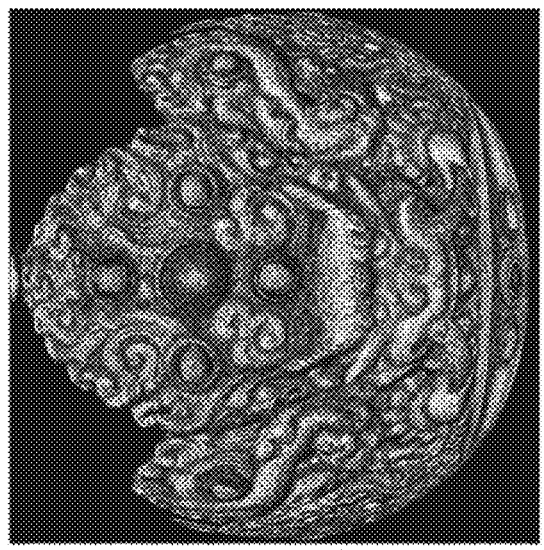
Figure 25:
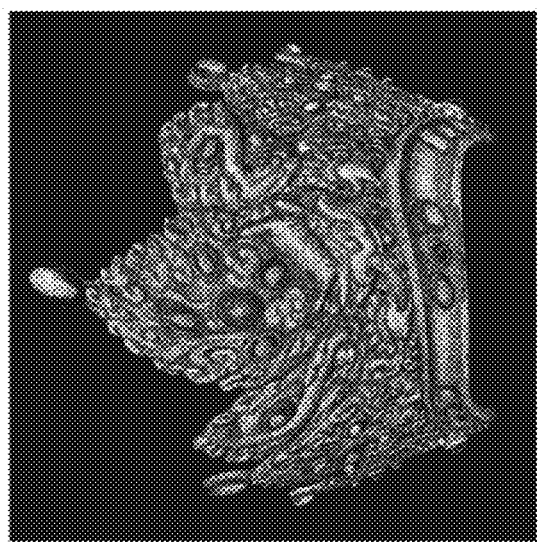

Another possible example of introducing image reference vectors would be to use image reference vectors for processing various images such as computer graphics and photographs. FIG. 25 illustrates images processed by introducing image reference vectors. (a) of FIG. 25 depicts an image before processing. (b) of FIG. 25 depicts an image to which a convex lens effect has been applied. (c) of FIG. 25 depicts an image to which a swirl effect has been applied. These processes generally directly manipulate the original pixels by using a filter. Therefore, color mixture occurs as described above because of interpolation over a relatively wide range, thus resulting in deterioration of the image quality.

According to the present embodiment, many of the processes associated with processing are carried out theoretically as vector calculations, and direct operation of pixel values is limited to local reference in the final stage, thus ensuring resistance to quality deterioration from the original image as illustrated. In the processing examples illustrated, displacement vectors from the original image for each pixel for producing the convex lens effect and the swirl effect can be readily found from corresponding geometric calculations, respectively. Therefore, processed display images can be readily generated as long as an image reference vector map is generated by finding image reference vectors from a displacement vector distribution and interpolating, as necessary, holes in a similar manner to that described in the present embodiment.

It should be noted that, in the case of such a processing process, the same image reference vector map can be used for the same processing. Therefore, it is only necessary to store the map in a storage apparatus and read out the map as necessary. Also, as long as a displacement vector distribution can be defined, a display image with minimal quality deterioration can be generated by similar processes not only in the example illustrated but also in various other types of processing and modifications.

Also, in the present embodiment, a position on a curved surface corresponding to a polygon is projected onto a screen, thus finding a displacement vector on the screen in question and using an inverse vector thereof as an image reference vector. Meanwhile, a "displacement vector" may be used as a vector in a three-dimensional space having a start point at a position on a polygon. In this case, if the displacement vector in question is projected onto the screen, the inverse vector thereof can be used as an image reference vector by following a similar procedure to that described in the present embodiment. Here, the end point of the displacement vector may be located on a curved surface patch like a Bezier curved surface defined separately. Alternatively, a displacement vector itself may be generated according to a given rule by using polygon information and so on without defining a curved surface.

REFERENCE SIGNS LIST

12 Display apparatus, 200 Image generation apparatus, 222 CPU, 224 GPU, 226 Main memory, 250 Input information acquisition section, 252 Virtual space generation section, 254 Model data storage section, 256 Intermediate image generation section, 258 Display image generation section, 260 Intermediate image storage section, 262 Output section, 264 Curved surface generation section, 266 Pixel displacement acquisition section, 268 Drawing section.

INDUSTRIAL APPLICABILITY

As described above, the present invention is applicable to various types of information processing apparatuses such as a gaming console, an image display apparatus, a mobile terminal, and a personal computer and to an information processing system including any one thereof.

The invention claimed is:

1. An image generation apparatus for generating an image representing a space including a three-dimensional object, the image generation apparatus comprising:
   an intermediate image generation section adapted to generate an intermediate image by projecting a polygon included in the object onto a plane;
   a pixel displacement acquisition section adapted to acquire information regarding displacement of position coordinates of the intermediate image that arises as a result of displacement of position coordinates on the polygon in a three-dimensional space according to a given rule;
   a drawing section adapted to identify a corresponding position of the intermediate image for each pixel of a display image on a basis of the information regarding displacement and draw the display image by determining a color value at the position in question as a color value of the pixel of the display image; and
   an output section adapted to output data of the display image, wherein
   the pixel displacement acquisition section generates, as the information regarding displacement, a vector map that represents a reference vector for each of the pixels including the post-displacement position coordinates on an image plane of the display image, the reference vector having a start point at post-displacement position coordinates and an end point at pre-displacement position coordinates in the displacement of the position coordinates of the intermediate image.

2. The image generation apparatus of claim 1, wherein in a case where post-displacement positions from a plurality of positions of the intermediate image overlap in a pixel region of the vector map, the pixel displacement acquisition section determines the reference vector of the pixel region in question by using the displacement that provides the post-displacement position in the three-dimensional space closer to a position of a virtual camera set in the projection onto the image plane.

3. The image generation apparatus of claim 1, further comprising:
   a curved surface generation section adapted to put the polygon in correspondence with a curved surface according to a given rule,
   wherein the pixel displacement acquisition section acquires the reference vector by projecting position coordinates on the curved surface corresponding to the position coordinates on the polygon onto the image plane.

4. The image generation apparatus of claim 3, wherein the pixel displacement acquisition section corrects the reference vector by finding a distance from a point on the curved surface located in a direction of a normal obtained by interpolating a normal vector of the object at each vertex of the polygon by referring to a distance map retained for each pixel of texture to be mapped onto the polygon.

5. The image generation apparatus of claim 1, wherein the pixel displacement acquisition section acquires a displacement of position coordinates of the intermediate image at smaller intervals than one pixel region and determines the reference vector for each pixel of the vector map from a positional relationship between a post-displacement position thereof and the pixel region of the vector map.

6. The image generation apparatus of claim 5, wherein the pixel displacement acquisition section changes the intervals at which to acquire the displacement on a basis of an angle between the polygon and the image plane or a magnitude of a reduction rate attributable to the angle at a time of projection of the polygon onto the plane.

7. The image generation apparatus of claim 3, wherein
   the curved surface generation section generates a parametric curved surface corresponding to the polygon, and
   the pixel displacement acquisition section acquires a correspondence between a position on the polygon and a position on the curved surface by mapping the polygon plane onto the corresponding parametric curved surface.

8. The image generation apparatus of claim 1, wherein the pixel displacement acquisition section sets, of the pixels of the vector map, the reference vector by means of interpolation using surrounding reference vectors for a pixel that does not fit into a category of a displacement destination from the position coordinates of the intermediate image.

9. The image generation apparatus of claim 1, wherein
   the intermediate image generation section acquires, in a process of determining a color value of the intermediate image or information regarding the polygon for each pixel, relative position coordinates on the polygon corresponding to the pixel, and
   the pixel displacement acquisition section acquires the reference vector for each of the pixels by acquiring a destination on the image plane onto which post-displacement position coordinates of the relative position coordinates on the polygon are projected.

10. The image generation apparatus of claim 1, wherein
    the pixel displacement acquisition section acquires, in parallel, the displacements from a plurality of position coordinates of the intermediate image, and verifies a distance between the post-displacement position in the three-dimensional space and the position of the virtual camera set in the projection onto the image plane for the plurality of displacements whose destinations are the same pixel, and generates a Z buffer having a Z axis as a projection direction representing a shortest distance value as the pixel of the displacement destination by using a plurality of the polygons, and
    the pixel displacement acquisition section further acquires, in parallel, vectors that trace back the displacements and generates the vector map by representing vectors corresponding to the displacements whose distance values are represented in the Z buffer as the pixel of the displacement destination.

11. The image generation apparatus of claim 1, wherein the pixel displacement acquisition section further includes the displacement of a silhouette corresponding to a change in viewpoint from the intermediate image in the displacement of the position coordinates of the intermediate image.

12. The image generation apparatus of claim 1, wherein the intermediate image generation section projects the polygon onto a plane set independently of the image plane of the display image.

13. The image generation apparatus of claim 12, wherein the intermediate image generation section selects a plane for generating the intermediate image on a basis of an area of the silhouette obtained by projecting the polygon.

14. The image generation apparatus of claim 12, wherein
the intermediate image generation section generates the intermediate images on a plurality of planes that vary depending on the polygon, and
the pixel displacement acquisition section stores identification information of the intermediate image representing, for each pixel of the display image, the corresponding polygon in association with the reference vector.

15. An image generation method for generating an image representing a space including a three-dimensional object, the image generation method comprising, by an image generation apparatus:
generating an intermediate image by projecting a polygon included in the object onto a plane;
acquiring information regarding displacement of position coordinates of the intermediate image that arises as a result of displacement of position coordinates on the polygon in a three-dimensional space according to a given rule;
identifying a corresponding position of the intermediate image for each pixel of a display image on a basis of the information regarding displacement and drawing the display image by determining a color value at the position in question as a color value of the pixel of the display image; and
outputting data of the display image, wherein
the acquiring the information regarding displacement generates, as the information regarding displacement, a vector map that represents a reference vector for each of the pixels including the post-displacement position coordinates on an image plane of the display image, the reference vector having a start point at post-displacement position coordinates and an end point at pre-displacement position coordinates in the displacement of the position coordinates of the intermediate image.

16. A non-transitory, computer readable storage medium containing a computer program, which when executed by a computer, causes the computer to generate an image representing a space including a three-dimensional object by carrying out actions, comprising:
generating an intermediate image by projecting a polygon included in the object onto a plane;
acquiring information regarding displacement of position coordinates of the intermediate image that arises as a result of displacement of position coordinates on the polygon in a three-dimensional space according to a given rule;
identifying a corresponding position of the intermediate image for each pixel of a display image on a basis of the information regarding displacement and drawing the display image by determining a color value at the position in question as a color value of the pixel of the display image; and
outputting data of the display image, wherein
the acquiring the information regarding displacement generates, as the information regarding displacement, a vector map that represents a reference vector for each of the pixels including the post-displacement position coordinates on an image plane of the display image, the reference vector having a start point at post-displacement position coordinates and an end point at pre-displacement position coordinates in the displacement of the position coordinates of the intermediate image.

* * * * *